(12) United States Patent
Yoshida et al.

(10) Patent No.: US 12,497,921 B2
(45) Date of Patent: *Dec. 16, 2025

(54) POWER GENERATION FACILITY

(71) Applicant: MITSUBISHI HEAVY INDUSTRIES, LTD., Tokyo (JP)

(72) Inventors: Shohei Yoshida, Yokohama (JP);
Akinori Hayashi, Yokohama (JP);
Tatsuya Hagita, Yokohama (JP);
Hiroyuki Takeishi, Tokyo (JP);
Toshiyuki Hiraoka, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/734,102

(22) Filed: Jun. 5, 2024

(65) Prior Publication Data
US 2024/0318599 A1   Sep. 26, 2024

Related U.S. Application Data

(63) Continuation of application No. 17/944,405, filed on Sep. 14, 2022, now Pat. No. 12,044,175.

(30) Foreign Application Priority Data

Sep. 30, 2021 (JP) .................................. 2021-160263
May 31, 2022 (JP) .................................. 2022-088799

(51) Int. Cl.
*F02C 7/22* (2006.01)
*F02C 3/22* (2006.01)
(Continued)

(52) U.S. Cl.
CPC ............... *F02C 7/222* (2013.01); *F02C 3/22* (2013.01); *F02C 7/232* (2013.01); *F02C 9/26* (2013.01);
(Continued)

(58) Field of Classification Search
CPC .. F02C 7/222; F02C 3/22; F02C 7/232; F02C 9/26; F02C 3/30; F02C 9/263; F02C 9/40
See application file for complete search history.

(56) References Cited

U.S. PATENT DOCUMENTS 4,393,817 A * 7/1983 Lindberg ............... F02M 25/00
                                                           123/3
4,541,367 A * 9/1985 Lindberg ............... F02B 43/10
                                                      123/568.15

(Continued)

FOREIGN PATENT DOCUMENTS

| CN | 101446420 A | 6/2009 |
| CN | 101526217 A | 9/2009 |

(Continued)

OTHER PUBLICATIONS

Office Action dated Aug. 16, 2024, issued in counterpart KR application No. 10-2022-120019 with English translation. (13 pages).

(Continued)

*Primary Examiner* — Gerald L Sung
*Assistant Examiner* — Rene D Ford
(74) *Attorney, Agent, or Firm* — WHDA, LLP

(57) ABSTRACT

A gas turbine facility includes: a fuel pipe connected to a fuel supply facility; a fuel supply pipe connected to a combustor of a gas turbine; a fuel treating pipe connected to a fuel treating apparatus that treats a fuel; and a three-way valve having an inlet port connected to the fuel pipe, a first outlet port connected to the fuel supply pipe, and a second outlet port connected to the fuel treating pipe.

7 Claims, 14 Drawing Sheets

(51) Int. Cl.
*F02C 7/232* (2006.01)
*F02C 9/26* (2006.01)
*F02C 3/30* (2006.01)
*F02C 9/40* (2006.01)

(52) U.S. Cl.
CPC ............... *F02C 3/30* (2013.01); *F02C 9/263* (2013.01); *F02C 9/40* (2013.01)

(56) References Cited

U.S. PATENT DOCUMENTS

| | | | |
|---|---|---|---|
| 5,098,680 A * | 3/1992 | Fellows | B01D 53/56 423/239.1 |
| 6,453,830 B1 * | 9/2002 | Zauderer | F23D 1/005 110/348 |
| 9,341,084 B2 | 5/2016 | Xie et al. | |
| 2005/0000220 A1 * | 1/2005 | Zauderer | B01D 53/56 60/39.55 |
| 2009/0139241 A1 | 6/2009 | Hirata et al. | |
| 2009/0223226 A1 | 9/2009 | Koizumi et al. | |
| 2012/0036825 A1 * | 2/2012 | Kasuga | F23R 3/286 60/39.52 |
| 2012/0047870 A1 * | 3/2012 | Kasuga | F02C 3/28 60/39.462 |
| 2015/0263368 A1 | 9/2015 | Nakamoto et al. | |
| 2018/0187883 A1 * | 7/2018 | Bulat | F23R 3/34 |
| 2019/0345873 A1 * | 11/2019 | Ito | B01D 53/90 |
| 2019/0360396 A1 * | 11/2019 | Ito | F02C 7/232 |
| 2019/0360397 A1 * | 11/2019 | Ito | F02C 3/22 |
| 2020/0018231 A1 * | 1/2020 | Ito | F02C 9/40 |
| 2020/0032676 A1 | 1/2020 | Nose et al. | |
| 2021/0062683 A1 | 3/2021 | Kiso | |

FOREIGN PATENT DOCUMENTS

| | | |
|---|---|---|
| CN | 204421021 U | 6/2015 |
| CN | 110312898 A | 10/2019 |
| CN | 112443398 A | 3/2021 |
| CN | 112727604 A | 4/2021 |
| JP | H05-171953 A | 7/1993 |
| JP | 2004-037038 A | 2/2004 |
| JP | 2005351196 A | 12/2005 |
| JP | 2008-031847 A | 2/2008 |
| JP | 2009-133220 A | 6/2009 |
| JP | 2013-241923 A | 12/2013 |
| JP | 2018-076794 A | 5/2018 |
| JP | 2019-178840 A | 10/2019 |
| KR | 10-2015-0060837 A | 6/2015 |

OTHER PUBLICATIONS

Office Action dated Sep. 5, 2024, issued in counterpart DE application No. 102022210265.7 with English translation. (8 pages).
Office Action dated Jun. 6, 2023, issued in counterpart JP Application No. 2022-088799, with English Translation. (7 pages).
Office Action dated Jun. 6, 2023, issued in counterpart TW Application No. 111131512. (7 pages).
Office Action (Restriction Requirement) dated Jul. 25, 2023 issued in parent U.S. Appl. No. 17/944,405.
Office Action dated Oct. 4, 2023 issued in parent U.S. Appl. No. 17/944,405.
Guoxing et al.; "Retrofit on Low-nitrogen Combustion System of PG9171E Gas Turbines", Power Equipment, vol. 27, No. 5, published Sep. 15, 2013 pp. 338-342, by Shanghai Power Generation Equipment Design and Research Institute Co., Ltd., Shanghai, China, with partial translation. (5 pages) cited in CN Office Action dated Jun. 26, 2025.
Office Action dated Jun. 26, 2025 issued in counterpart CN Application No. 202211195022.9 with English machine translation. (17 pages).

* cited by examiner

POWER GENERATION FACILITY

This application is a continuation of U.S. application Ser. No. 17/944,405 filed on Sep. 14, 2022, and is based upon and claims the benefits of priority from Japanese Patent Application No. 2021-160263 filed on Sep. 30, 2021 and Japanese Patent Application No. 2022-088799 filed on May 31, 2022, the entire contents of which being incorporated herein by reference.

BACKGROUND OF THE INVENTION

1. Field of the Invention

The present invention relates to a gas turbine facility.

2. Description of the Related Art

For gas turbine facilities, it is planned that ammonia, hydrogen, and the like are used as fuels for combustors of a gas turbine in order to reduce the discharge amount of carbon dioxide, which becomes one cause of global warming, in terms of global environment protection.

Patent Document 1 discloses a gas turbine facility where an ammonia gas is supplied as a fuel to combustors, and a turbine is rotated by a combustion gas generated by combusting the ammonia gas at the combustors. The gas turbine facility described in Patent Document 1 includes a tank that stores a liquid ammonia, and a vaporizer that vaporizes the liquid ammonia.

A pipe that supplies the fuel from the vaporizer to the combustors is provided with a first on-off valve, a second on-off valve, and a first control valve in this order from the upstream side toward the downstream side of the pipe. In addition, a pipe connecting the first on-off valve and the second on-off valve to each other is connected with a recovery tank that recovers the ammonia gas via a third on-off valve.

In Patent Document 1, description is made that checking whether or not leakage occurs is performed by closing the first on-off valve after the ammonia gas is supplied from the vaporizer to the ammonia supply pipe in a state of the second on-off valve being closed, to thereby make the inside of a leak check pipe a sealed space. Further, in Patent Document 1, description is made that recovering the ammonia gas remaining in the ammonia supply pipe to the recovery tank is performed by opening the third on-off valve after the leak check is performed or after the plant is stopped.

PRIOR ART DOCUMENT

Patent Document

Patent Document 1: JP-2019-178840-A

SUMMARY OF THE INVENTION

However, regarding the gas turbine facility described in Patent Document 1, there is a fear of an occurrence of a malfunction that, at a time of an emergency stop of the gas turbine, the ammonia gas, which is an uncombusted fuel remaining in the ammonia supply pipe, is released to the atmosphere.

Regarding a gas turbine facility, it is desired to prevent malfunctions resulting from an uncombusted fuel at a time of an emergency stop of a gas turbine. Malfunctions resulting from an uncombusted fuel include, in addition to release of an ammonia gas into the atmosphere, ignition of a hydrogen gas, which is a remaining uncombusted fuel, at unintended locations or timings in a case of a fuel being hydrogen.

An object of the present invention is to provide a gas turbine facility that can prevent a malfunction resulting from an uncombusted fuel at a time of an emergency stop of a gas turbine.

A gas turbine facility according to an aspect of the present invention includes: a fuel pipe connected to a fuel supply facility; a fuel supply pipe connected to a combustor of a gas turbine; a fuel treating pipe connected to a fuel treating apparatus that treats a fuel; and a three-way valve having an inlet port connected to the fuel pipe, a first outlet port connected to the fuel supply pipe, and a second outlet port connected to the fuel treating pipe.

According to the present invention, it is possible to provide a gas turbine facility that can prevent a malfunction resulting from an uncombusted fuel at a time of an emergency stop of a gas turbine.

DESCRIPTION OF THE PREFERRED EMBODIMENTS

Figure 1:
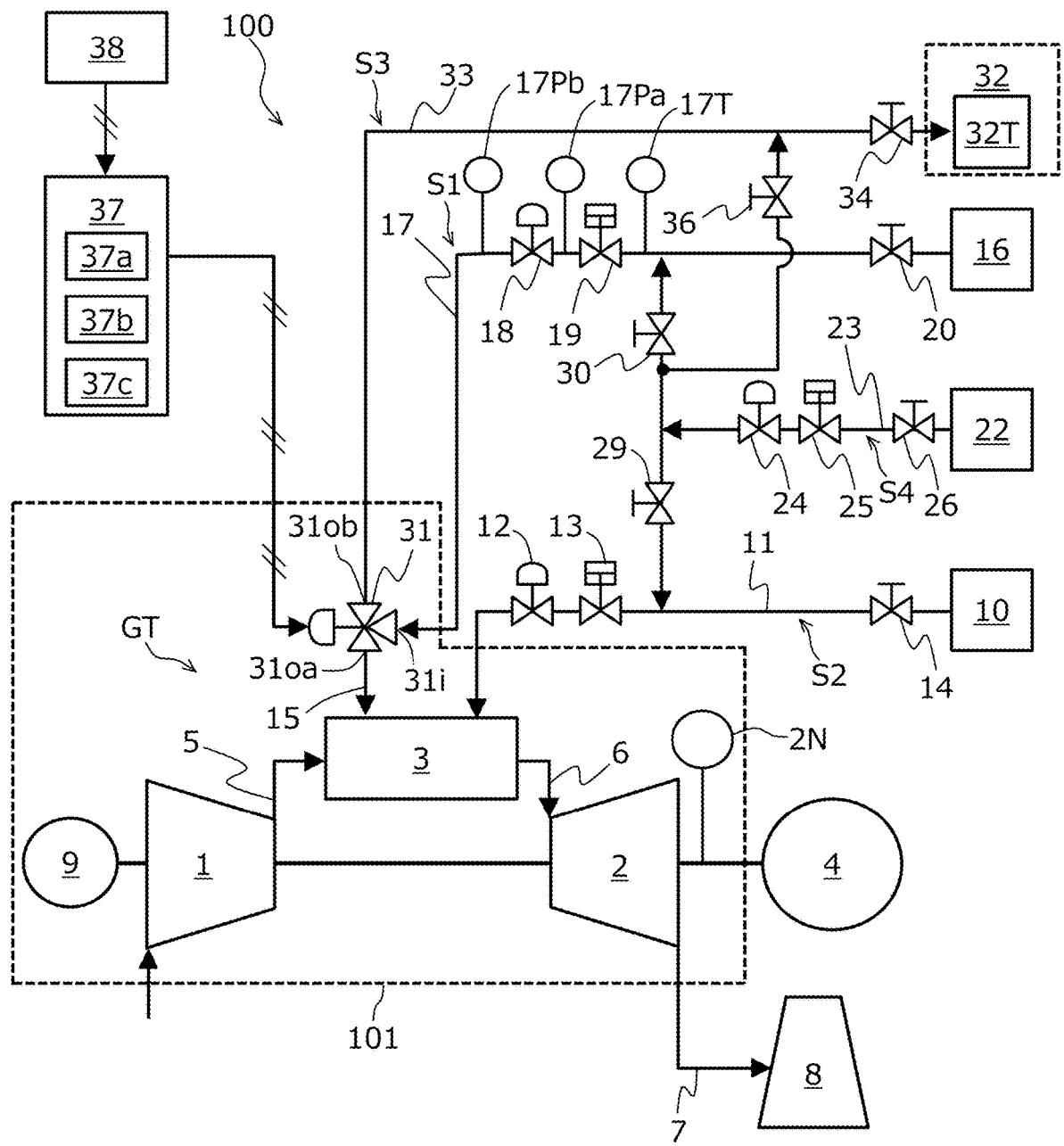
FIG. 1 is a schematic figure depicting the configuration of a gas turbine facility according to a first embodiment of the present invention, and depicts a main fuel supply system, a secondary fuel supply system, a fuel treating system, and a nitrogen gas supply system.

Implementation examples of the present invention are explained below by using the figures. Note that identical configurations in the figures are given identical reference characters, and detailed explanations of overlapping portions are omitted.

First Embodiment

With reference to FIG. 1 to FIG. 5, a gas turbine facility 100 according to a first embodiment of the present invention is explained.

FIG. 1 is a schematic figure depicting the configuration of the gas turbine facility 100 according to the first embodiment of the present invention, and depicts a main fuel supply system S1, a secondary fuel supply system S2, a fuel treating system S3, and a nitrogen gas supply system S4.

As depicted in FIG. 1, the gas turbine facility 100 includes: a gas turbine GT; an activation motor 9 that is connected to the gas turbine GT, and activates the gas turbine GT; and an enclosure 101 that houses the gas turbine GT and the activation motor 9.

The gas turbine GT has: a turbine 2; a compressor 1 that is coupled to the turbine 2, and generates air 5 that is for combustion, and has been compressed (hereinafter, written also as compressed air); and a plurality of combustors 3. Note that one combustor 3 is representatively depicted in FIG. 1.

The enclosure 101 is provided so as to surround the peripheries of the compressor 1, the turbine 2, and the plurality of combustors 3, and prevents diffusion of noise generated at the gas turbine GT, and the like.

The compressor 1 takes in and compresses outside air, and supplies the air 5 that has been compressed (compressed air) to the combustors 3. The combustors 3 generate a high-temperature combustion gas 6 by combusting a mixed gas which is a mixture of the air 5 compressed by the compressor 1 and a fuel.

The turbine 2 generates a rotational driving force by using the combustion gas 6 generated by the combustors 3. The rotation shaft of the turbine 2 is coupled to the rotation shaft of a generator 4. The generator 4 performs power generation by using the rotational driving force transferred from the turbine 2. The combustion gas 6 after having driven the turbine 2 is released to the outside of the gas turbine facility 100 as an exhaust gas 7 from a chimney 8.

The gas turbine facility 100 includes the main fuel supply system S1, the secondary fuel supply system S2, the fuel treating system S3, the nitrogen gas supply system S4, and a controller 37 that controls each system. In addition, the gas turbine facility 100 includes a three-way valve 31 having an inlet port 31$i$, a first outlet port 31$oa$, and a second outlet port 31$ob$.

Note that the gas turbine facility 100 includes a plurality of sensors such as a rotation speed sensor 2N that senses the rotation speed of the gas turbine GT, and outputs signals representing sensing results to the controller 37. The controller 37 is connected with an input apparatus 38 to be operated by an operator. The controller 37 controls a plurality of control valves on the basis of operation signals from the input apparatus 38 and signals from a plurality of sensors.

The plurality of control valves include isolation valves 13, 19, 25, 55, and 55$s$ mentioned later, flow rate adjustment valves 12, 18, 24, 54, and 54$s$ mentioned later, and the three-way valve 31. In the present specification, each isolation valve has a supply position for opening its internal passage (open position), and an interruption position for closing the internal passage. When the isolation valve is at the supply position, a fluid on the upstream side of the isolation valve is supplied to the downstream side through the isolation valve, and when the isolation valve is at the interruption position, the supply of the fluid from the upstream side to the downstream side of the isolation valve is interrupted. Each flow rate adjustment valve adjusts the flow rate of the passing fluid by adjusting the opening area of its internal passage.

The main fuel supply system S1 is a system that supplies an ammonia gas as a main fuel to the combustors 3. The main fuel supply system S1 has: a main fuel supply facility 16 that supplies the ammonia gas; a main fuel pipe 17 connected to the main fuel supply facility 16 and the inlet port 31$i$ of the three-way valve 31; and an on-off valve 20, the isolation valve 19, and the flow rate adjustment valve 18 that are provided on the main fuel pipe 17. The first outlet port 31$oa$ of the three-way valve 31 is connected to a main fuel supply pipe 15. The main fuel supply pipe 15 is connected to the combustors 3 of the gas turbine GT. That is, the main fuel pipe 17 is connected to the combustors 3 via the three-way valve 31.

In a state in which the three-way valve 31 establishes communication between the main fuel pipe 17 and the main fuel supply pipe 15, the ammonia gas supplied from the main fuel supply facility 16 to the main fuel pipe 17 is supplied to the combustors 3 through the three-way valve 31 and the main fuel supply pipe 15.

The main fuel supply facility 16 includes: a tank (not depicted) that stores a liquid ammonia; a pump (not depicted) that pumps the liquid ammonia; a vaporizer (not depicted) that vaporizes the liquid ammonia that has been pressurized by the pump; and a heating apparatus (not depicted) for preventing the vaporized liquid ammonia from liquefying.

The on-off valve 20, the isolation valve 19, and the flow rate adjustment valve 18 are provided in this order from the upstream side toward the downstream side of the main fuel pipe 17 through which the main fuel is supplied from the main fuel supply facility 16. The on-off valve 20 is a manual valve that can open and close the main fuel pipe 17.

The isolation valve 19 is a control valve that can open and close the main fuel pipe 17 according to a signal from the controller 37. The isolation valve 19 is provided between the main fuel supply facility 16 and the flow rate adjustment valve 18 on the main fuel pipe 17, and has a supply position for supplying the fuel from the main fuel supply facility 16 to the combustors 3, and an interruption position for interrupting the supply of the fuel from the main fuel supply facility 16 to the combustors 3.

The flow rate adjustment valve 18 is a control valve that controls the flow rate of the main fuel passing through the flow rate adjustment valve 18, that is, the flow rate of the fuel (ammonia gas) supplied to the combustors 3, by adjusting the opening area of the main fuel pipe 17 according to a signal from the controller 37.

The main fuel pipe 17 is provided with a fuel temperature sensor 17T, an inlet pressure sensor 17Pa and, in some cases, an outlet pressure sensor 17Pb. The fuel temperature sensor 17T senses the temperature of the ammonia gas, and outputs a signals representing a sensing result to the controller 37. The inlet pressure sensor 17Pa senses the inlet-side pressure of the flow rate adjustment valve 18, and outputs a signal representing a sensing result to the controller 37. In some cases, the outlet pressure sensor 17Pb senses the outlet-side pressure of the flow rate adjustment valve 18, and outputs a signal representing a sensing result to the controller 37.

The controller 37 controls a pressurizing pump (not depicted) of the main fuel supply facility 16, a heating apparatus (not depicted), and the degree of opening of the flow rate adjustment valve 18 on the basis of the temperature sensed by the fuel temperature sensor 17T (written also as fuel temperature), the pressure sensed by the inlet pressure sensor 17Pa, the pressure sensed by the outlet pressure sensor 17Pb in some cases, and a demanded flow rate of the fuel supplied to the combustors 3.

The fuel treating system S3 has: a fuel treating apparatus 32 that treats a fuel (uncombusted fuel); a fuel treating pipe 33 connected to the fuel treating apparatus 32 and the second outlet port 31ob of the three-way valve 31; and an on-off valve 34 provided on the fuel treating pipe 33. The on-off valve 34 is a manual valve that can open and close the fuel treating pipe 33.

The fuel treating apparatus 32 includes: a water tank 32T in which water for dissolving the ammonia gas introduced through the fuel treating pipe 33 is stored; a water supply pump (not depicted) that supplies water to the water tank 32T; and a valve (not depicted) that controls the flow rate of the water supplied from the water supply pump.

The ammonia gas is introduced to the fuel treating apparatus 32 through the fuel treating pipe 33. The ammonia gas has favorable water solubility. Because of this, when the ammonia gas is introduced into the water tank 32T of the fuel treating apparatus 32, the ammonia gas is dissolved into the water. The concentration of ammonia in the water tank 32T is adjusted to be equal to or lower than a predetermined concentration (e.g. approximately 20% to 25%) by the fuel treating apparatus 32.

The secondary fuel supply system S2 is a system that supplies a natural gas as a secondary fuel to the combustors 3. The secondary fuel supply system S2 has: a secondary fuel supply facility 10 that supplies the natural gas; a secondary fuel pipe 11 connected to the secondary fuel supply facility 10 and the combustors 3; and an on-off valve 14, the isolation valve 13, and the flow rate adjustment valve 12 that are provided on the secondary fuel pipe 11.

The secondary fuel supply facility 10 includes: a tank (not depicted) that stores a liquefied natural gas (LNG); a pump (not depicted) that pumps the liquefied natural gas; and a vaporizer (not depicted) that vaporizes the liquefied natural gas pressurized by the pump. The natural gas generated by the vaporizer is supplied to the secondary fuel pipe 11.

The on-off valve 14, the isolation valve 13, and the flow rate adjustment valve 12 are provided in this order from the upstream side toward the downstream side of the secondary fuel pipe 11 through which the secondary fuel is supplied from the secondary fuel supply facility 10. The on-off valve 14 is a manual valve that can open and close the secondary fuel pipe 11. The isolation valve 13 is a control valve that can open and close the secondary fuel pipe 11 according to a signal from the controller 37. The flow rate adjustment valve 12 is a control valve that controls the flow rate of the secondary fuel passing through the flow rate adjustment valve 12 by adjusting the opening area of the secondary fuel pipe 11 according to a signal from the controller 37.

The combustors 3 can stably combust the main fuel and the secondary fuel. The controller 37 operates the gas turbine GT in a plurality of operation modes. The plurality of operation modes include: a natural gas mono-fuel combustion mode in which only the natural gas is combusted by the combustors 3; a mixed combustion mode in which the ammonia gas and the natural gas are combusted simultaneously by the combustors 3; and an ammonia gas mono-fuel combustion mode in which only the ammonia gas is combusted by the combustors 3.

The nitrogen gas supply system S4 is a system that replaces, with nitrogen, the fuels remaining in the main fuel pipe 17 of the main fuel supply system S1, the secondary fuel pipe 11 of the secondary fuel supply system S2, and the fuel treating pipe 33 of the fuel treating system S3. The nitrogen gas supply system S4 has: a nitrogen gas supply facility 22; a nitrogen gas pipe 23 connected to the nitrogen gas supply facility 22; and an on-off valve 26, the isolation valve 25, and the flow rate adjustment valve 24 that are provided on the nitrogen gas pipe 23.

On the downstream side of the flow rate adjustment valve 24, the nitrogen gas pipe 23 is connected to the main fuel pipe 17 via an on-off valve 30. In addition, on the downstream side of the flow rate adjustment valve 24, the nitrogen gas pipe 23 is connected to the secondary fuel pipe 11 via an on-off valve 29. Furthermore, on the downstream side of the flow rate adjustment valve 24, the nitrogen gas pipe 23 is connected to the fuel treating pipe 33 via an on-off valve 36. The on-off valves 29, 30, and 36 are manual valves that can open and close the nitrogen gas pipe 23.

The nitrogen gas supply facility 22 includes: a tank (not depicted) that stores a liquid nitrogen; a pump (not depicted) that pumps the liquid nitrogen; and a vaporizer (not depicted) that vaporizes the liquid nitrogen pressurized by the pump. The nitrogen gas generated by the vaporizer is supplied to the nitrogen gas pipe 23.

The on-off valve 26, the isolation valve 25, and the flow rate adjustment valve 24 are provided in this order from the upstream side toward the downstream side of the nitrogen gas pipe 23 through which the nitrogen gas is supplied from the nitrogen gas supply facility 22. The on-off valve 26 is a manual valve that can open and close the nitrogen gas pipe 23. The isolation valve 25 is a control valve that can open and close the nitrogen gas pipe 23 according to a signal from the controller 37. The flow rate adjustment valve 24 is a control valve that controls the flow rate of the nitrogen gas passing through the flow rate adjustment valve 24 by adjusting the opening area of the nitrogen gas pipe 23 according to a signal from the controller 37.

The controller 37 controls various types of control valve (the isolation valves 13, 19, 25, 55, and 55s, the flow rate adjustment valves 12, 18, 24, 54, and 54s, the three-way valve 31, etc.). The controller 37 is configured by using a computer including: a processor 37a such as a central processing unit (CPU), a micro processing unit (MPU) or a digital signal processor (DSP); a non-volatile memory 37b such as a read only memory (ROM), a flash memory or a hard disk drive; a volatile memory 37c which is a so-called random access memory (RAM); an input/output interface; and other peripheral circuits. Note that the controller 37 may be configured by using one computer or may be configured by using a plurality of computers.

The non-volatile memory 37b has stored thereon: a program that can execute various types of computation; thresholds; mathematical formulae; data tables; and the like. That is, the non-volatile memory 37b is a storage medium from which a program that realizes functionalities according to the present embodiment can be read out. The processor 37a is a computing apparatus that loads the program stored on the non-volatile memory 37b onto the volatile memory 37c, and executes computations, and performs a predetermined computation process on signals taken in from the input/output interface, the non-volatile memory 37b, and the volatile memory 37c in accordance with the program.

An input section of the input/output interface converts signals input from the input apparatus 38 and various types of sensors into a format on which the processor 37a can perform computations. In addition, an output section of the input/output interface generates signals for output according to results of computations at the processor 37a, and outputs the signals to various types of control valve (the isolation valves 13, 19, 25, 55, and 55s, the flow rate adjustment valves 12, 18, 24, 54, and 54s, the three-way valve 31, etc.), pumps and the like.

As mentioned above, the inlet port 31i, first outlet port 31oa, and second outlet port 31ob of the three-way valve 31 are connected to the main fuel pipe 17, the main fuel supply pipe 15, and the fuel treating pipe 33, respectively. The three-way valve 31 has: a first position for establishing communication between the inlet port 31i and the first outlet port 31oa, and interrupting communication between the inlet port 31i and the second outlet port 31ob; and a second position for establishing communication between the inlet port 31i and the second outlet port 31ob, and interrupting communication between the inlet port 31i and the first outlet port 31oa. That is, the three-way valve 31 can selectively establish communication of the inlet port 31i with one of the first outlet port 31oa and the second outlet port 31ob. Thereby, when the turbine 2 is stopped emergently, the ammonia gas remaining in the main fuel pipe 17 can be introduced to the fuel treating apparatus 32 by causing the three-way valve 31 to establish communication between the main fuel pipe 17 and the fuel treating pipe 33.

Where a gas turbine facility that uses an ammonia gas as a main fuel is newly installed, the isolation valve 19 and the flow rate adjustment valve 18 are preferably placed near the combustors 3 as much as possible. However, where a fuel system that uses an ammonia gas is additionally installed in a gas turbine facility that has already been installed, for example, the ammonia (main fuel) supply facility 16, and the isolation valve 19 and flow rate adjustment valve 18 that are facilities accompanying the ammonia supply facility 16 are arranged at positions apart from a natural gas supply facility. If the ammonia (main fuel) supply facility 16 is arranged at a position farther from the turbine 2 than the natural gas (secondary fuel) supply facility 10 is, the length of the main fuel pipe 17 in the main fuel supply system S1 from the isolation valve 19 to the combustors 3 becomes longer than the length of the secondary fuel pipe 11 in the secondary fuel supply system S2 from the isolation valve 13 to the combustors 3.

The three-way valve 31 introduces the ammonia gas remaining in the main fuel pipe 17 from the isolation valve 19 to the three-way valve 31 to the fuel treating apparatus 32 through the fuel treating pipe 33. On the other hand, the ammonia gas remaining in the main fuel supply pipe 15 is released to the outside of the gas turbine facility 100, that is, to the atmosphere, through the combustors 3, the turbine 2, and the chimney 8. Accordingly, if the three-way valve 31 is arranged between the isolation valve 19 and the flow rate adjustment valve 18, that is, at a position closer to the main fuel supply facility 16 than to the combustors 3, the length of the main fuel supply pipe 15 becomes long undesirably, thus the amount of the ammonia gas to be released to the atmosphere also increases undesirably. Because of this, the three-way valve 31 is preferably arranged near the combustors 3 as much as possible.

In the present embodiment, the three-way valve 31 is arranged between the flow rate adjustment valve 18 and the combustors 3. That is, the three-way valve 31 is arranged downstream of the flow rate adjustment valve 18 on the main fuel pipe 17. In addition, the three-way valve 31 is arranged at a position closer to the combustors 3 than to the flow rate adjustment valve 18. In the present embodiment, the three-way valve 31 is arranged inside the enclosure 101. Thereby, the length of the main fuel supply pipe 15 connecting the three-way valve 31 and the combustors 3 to each other can be reduced. As a result, the amount of discharge of the ammonia gas to the atmosphere at a time of an emergency stop of the turbine 2 can be kept small.

Note that although not depicted in FIG. 1, a manifold 150 (see FIG. 16) is provided on the main fuel supply pipe 15, and the manifold 150 is connected with the plurality of combustors 3. The manifold 150 has a circular space to be supplied with the ammonia gas. Each of the plurality of combustors 3 is supplied with the fuel from the manifold 150. That is, the manifold 150 causes the fuel to be supplied to the plurality of combustors 3 in a branched manner.

Figure 2:
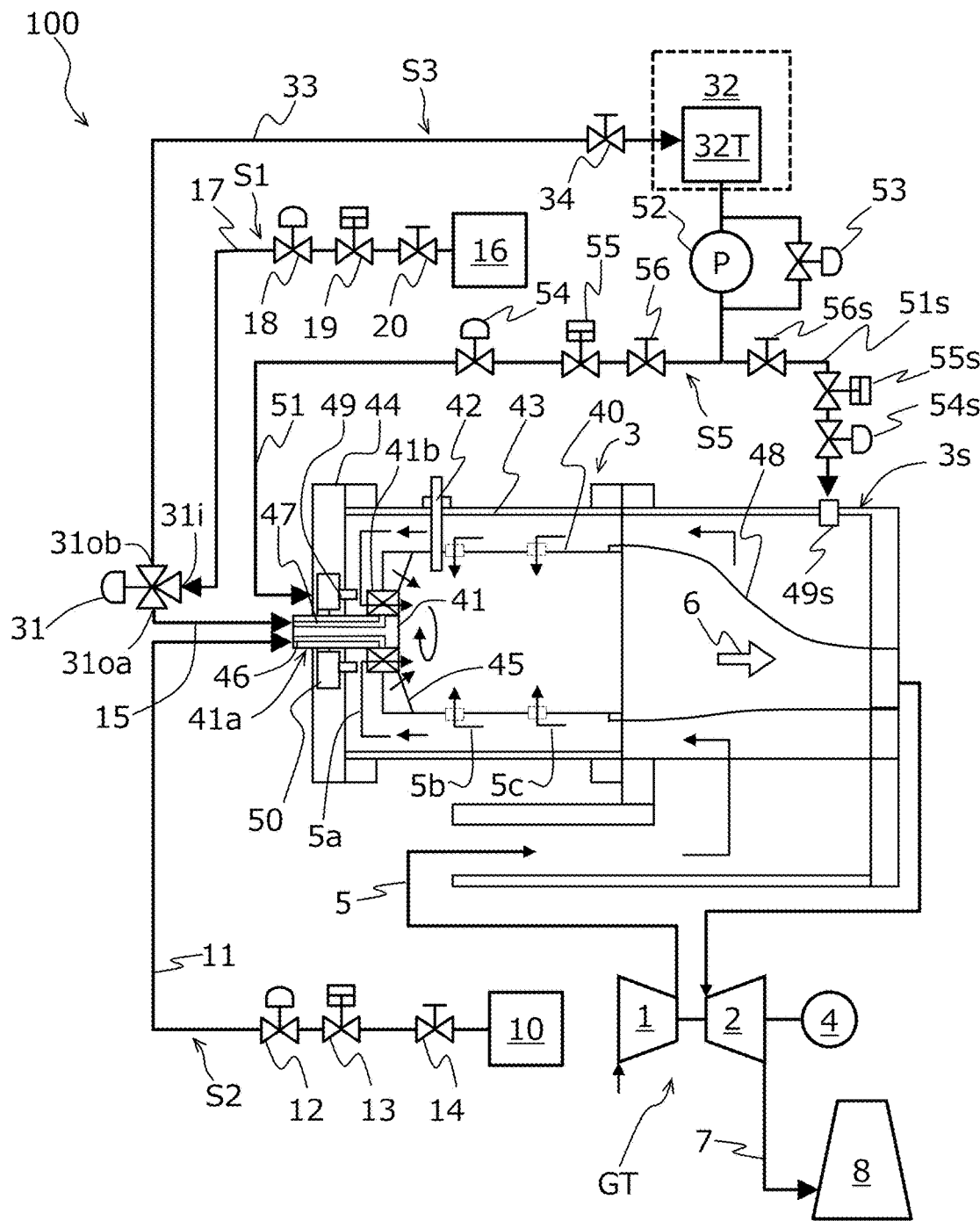
FIG. 2 is a schematic figure depicting the configuration of the gas turbine facility according to the first embodiment of the present invention, and depicts the main fuel supply system, the secondary fuel supply system, the fuel treating system, and a water supply system.

FIG. 2 is a schematic figure depicting the configuration of the gas turbine facility 100 according to the first embodiment of the present invention, and depicts the main fuel supply system S1, the secondary fuel supply system S2, the fuel treating system S3, and a water supply system S5. The controller 37 is omitted in FIG. 2.

As depicted in FIG. 2, the combustors 3 generate the combustion gas 6 by mixing the compressed air 5 supplied from the compressor 1 with the fuels supplied from the fuel systems (the main fuel supply system S1 and the secondary fuel supply system S2) and combusting the mixture. Each combustor 3 has an inner cylinder (liner) 40, a burner 41, a spark plug 42, an outer cylinder (sleeve) 43, and an end cover 44. The combustor 3 is a pressure container sealing therein the inner cylinder 40, the burner 41, and the spark plug 42 by using the outer cylinder 43 and the end cover 44, and is connected to a casing 3s.

The inner cylinder 40 is a cylindrical member forming a combustion chamber therein, and generates the combustion gas 6 therein. The burner 41 is provided at an axial center position on the left end side of the inner cylinder 40 in the figure. Note that the periphery of the burner 41 is provided with an inner cylinder cap 45.

The burner 41 has a fuel nozzle 41a that injects fuels such as the ammonia gas or the natural gas, and a swirler 41b that is provided at the periphery of the fuel nozzle 41a and generates a swirling flow.

An injection hole for each type of fuel is formed through the fuel nozzle 41a. An injection hole 46 that communicates with the secondary fuel pipe 11, and is for allowing the natural gas to be injected, and an injection hole 47 that communicates with the main fuel supply pipe 15, and is for allowing the ammonia gas to be injected are formed through the fuel nozzle 41a according to the present embodiment.

Note that whereas the injection holes 46 and 47 according to types of fuel are formed through the fuel nozzle 41a in the example explained in the present embodiment, the present invention is not limited to this. There may be one system of injection holes in the burner 41. In this case, for example, an apparatus that can switch fuels supplied from fuel systems to be introduced to the injection holes, or can mix fuels supplied from fuel systems and introduce the mixture to the injection holes (a fuel switching apparatus or a fuel mixing apparatus) is provided upstream of the burner 41.

The outer cylinder 43 is provided on the outer-circumference side of the inner cylinder 40. The inner circumferential surface of the outer cylinder 43 and the outer circumferential surface of the inner cylinder 40 form a flow path (written also as an air flow path) of the compressed air 5 introduced from an opening on one end side of the outer cylinder 43. An opening on the other end side of the outer cylinder 43 is closed by the end cover 44.

The compressed air 5 generated by the compressor 1 flows, via the casing 3s, through a circular air flow path formed by the outer cylinder 43 and inner cylinder 40 of the combustor 3. Part of the compressed air 5 flowing through the circular air flow path is introduced, as diluted air Sc, into the inner cylinder 40 from dilution holes provided through the inner cylinder 40, and mixed with the combustion gas 6. Part of the compressed air 5 flowing through the circular air flow path is introduced, as secondary combustion air 5b, into the inner cylinder 40 from combustion holes provided through the inner cylinder 40. The secondary combustion air 5b is used for combustion together with a fuel that has not been fully combusted with combustion air 5a mentioned later.

In addition, part of the compressed air 5 flowing through the circular air flow path is introduced, as liner cooling air, into the inner cylinder 40 from cooling holes provided through the inner cylinder cap 45. Furthermore, part of the compressed air 5 flowing through the circular air flow path is introduced, as the combustion air 5a, into the inner cylinder 40 through the swirler 41b.

The combustion air (compressed air) 5a supplied to the inner cylinder 40 is mixed with the fuels (the ammonia gas and the natural gas). The mixed gas containing the combustion air 5a and the fuels is ignited by the spark plug 42 inside the inner cylinder 40, and combusted. The thus-generated combustion gas 6 is supplied to the turbine 2 through a transition piece 48, and drives the turbine 2.

The combustion air (compressed air) 5a passing through the swirler 41b generates a swirling flow. Generation of the swirling flow stabilizes flames in the inner cylinder 40.

The gas turbine facility 100 according to the present embodiment includes the water supply system S5. The water supply system S5 is a system that reduces the discharge amount of nitrogen oxides (NOx) in the exhaust gas 7, which becomes a cause of air pollution, by spraying water to combustion sites of the combustors 3, and also increases output by increasing a working fluid for the turbine 2. The water supply system S5 has: a water supply pipe 51 connected to the water tank 32T of the fuel treating apparatus 32 and the combustors 3; a water pump 52, a pressure adjustment valve 53, an on-off valve 56, the isolation valve 55, and the flow rate adjustment valve 54 that are provided on the water supply pipe 51; and spray nozzles 49 mentioned later.

In addition, the water supply system S5 has: a water supply pipe 51s that branches off from the water supply pipe 51 downstream of the water pump 52; an on-off valve 56s, the isolation valve 55s, and the flow rate adjustment valve 54s that are provided on the water supply pipe 51s; and spray nozzles 49s mentioned later.

The water pump 52 sucks ammonia water in the water tank 32T of the fuel treating apparatus 32, and delivers it. The water supply pipes 51 and 51s supply, to the combustors 3, the ammonia water delivered from the water pump 52.

The on-off valve 56 is a manual valve that can open and close the water supply pipe 51. The isolation valve (water isolation valve) 55 is a control valve that can open and close the water supply pipe 51 according to a signal from the controller 37. The isolation valve 55 has a supply position for supplying the ammonia water from the water tank 32T to the combustors 3, and an interruption position for interrupting the supply of the ammonia water from the water tank 32T to the combustors 3. In addition, the on-off valve 56s is a manual valve that can open and close the water supply pipe 51s. The isolation valve (water isolation valve) 55s is a control valve that can open and close the water supply pipe 51s according to a signal from the controller 37. The isolation valve 55s has a supply position for supplying the ammonia water from the water tank 32T to the combustors 3, and an interruption position for interrupting the supply of the ammonia water from the water tank 32T to the combustors 3.

The flow rate adjustment valve 54 is a control valve that controls the flow rate of the ammonia water passing through the flow rate adjustment valve 54 by adjusting the opening area of the water supply pipe 51 according to a signal from the controller 37. In addition, the flow rate adjustment valve 54s is a control valve that controls the flow rate of the ammonia water passing through the flow rate adjustment valve 54s by adjusting the opening area of the water supply pipe 51s according to a signal from the controller 37. The pressure adjustment valve 53 adjusts the pressure in the water supply pipe 51 (the delivery pressure of the water pump 52) according to a signal from the controller 37.

The water manifold 50, and a plurality of the spray nozzles 49 that communicate with the water manifold 50 are formed through the end cover 44 of the combustor 3. The water manifold 50 has a circular space to be supplied with the ammonia water from the water supply pipe 51. The plurality of spray nozzles 49 are provided at positions facing the swirler 41b. The ammonia water supplied from the water supply pipe 51 is sprayed by the spray nozzles 49 to the combustion air (compressed air) 5a introduced into the swirler 41b.

In addition, a plurality of the spray nozzles 49s communicating with the inside of the casing 3s are formed through the casing 3s. The ammonia water supplied from the water supply pipe 51s is sprayed by the spray nozzles 49s to the inside of the casing 3s.

Figure 3:
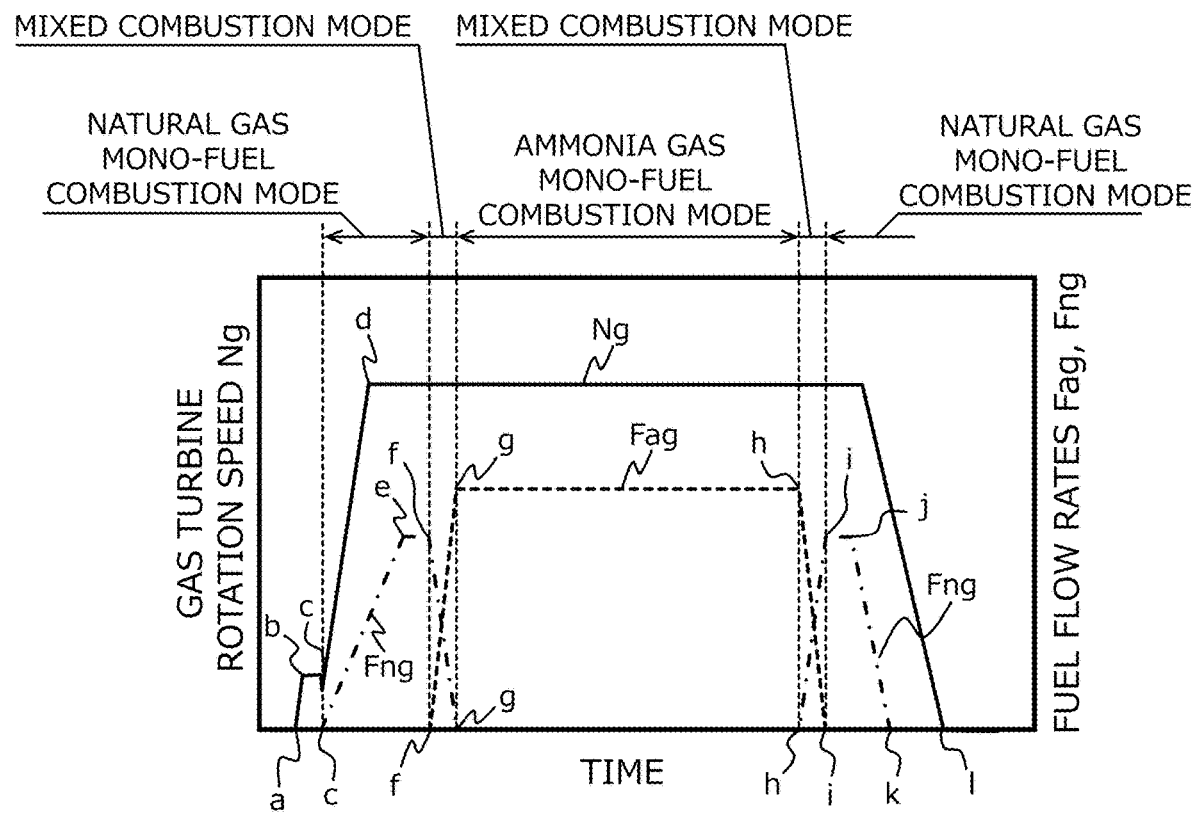
FIG. 3 is a figure depicting an example of temporal changes in the rotation speed of a gas turbine according to the first embodiment of the present invention and fuel flow rates in normal operation of the gas turbine.

With reference to FIG. 3, an example of a method to be performed at a time of normal operation of the gas turbine GT according to the present embodiment is explained. FIG. 3 is a figure depicting an example of temporal changes in the rotation speed Ng of the gas turbine GT according to the first embodiment of the present invention and fuel flow rates in normal operation of the gas turbine GT. Note that the fuel flow rates include a natural gas fuel flow rate Fng which is the flow rate of the natural gas supplied to the combustors 3, and an ammonia gas fuel flow rate Fag which is the flow rate of the ammonia gas supplied to the combustors 3.

It is difficult to ignite an ammonia gas as compared with a natural gas. Because of this, the gas turbine facility 100 according to the present embodiment activates the gas turbine GT by using the natural gas, which is highly reliable in terms of ignition and activation, and thereafter switches the fuels from the natural gas to the ammonia gas.

As depicted in FIG. 3, the gas turbine GT is activated by the activation motor 9 (see FIG. 1) at point a. At point b where the rotation speed of the gas turbine GT becomes a predetermined rotation speed, purge operation for a fuel, which is likely to be remaining, is implemented for a certain length of time. Then, at point c, the natural gas is supplied to the combustors 3, and ignited by the spark plugs 42.

Due to the ignition in the combustors 3, the rotation speed Ng of the gas turbine GT increases from point c until point d, and reaches a rated rotation speed at point d. The activation motor 9 is disconnected from the rotation shaft (rotor) of the turbine 2 during the increase in the rotation speed from point c until point d. Accordingly, at point d at which the rated rotation speed is reached, the energy of the combustion gas 6 generated in the combustors 3 singly rotates the turbine 2.

The controller 37 increases the natural gas fuel flow rate Fng until point e such that a predetermined load is generated after the rotation speed Ng of the gas turbine GT has reached the rated rotation speed. Thereafter, the controller 37 operates the gas turbine facility 100 in the natural gas mono-fuel combustion mode until point f.

After point f is reached, the controller 37 gradually reduces the natural gas fuel flow rate Fng, and also gradually increases the ammonia gas fuel flow rate Fag. From point f until point g, the controller 37 operates the gas turbine facility 100 in the mixed combustion mode in which both the natural gas and the ammonia gas are supplied to the combustors 3, and combusted.

At point g, the controller 37 makes the natural gas fuel flow rate Fng 0 (zero), and operates the gas turbine facility 100 in the ammonia gas mono-fuel combustion mode from point g. In the ammonia gas mono-fuel combustion mode, only the ammonia gas is combusted in the combustors 3, thus the amount of carbon dioxide contained in the exhaust gas 7 can be reduced as compared to at a time of the natural gas mono-fuel combustion mode.

After point h is reached, the controller 37 gradually reduces the ammonia gas fuel flow rate Fag, and also gradually increases the natural gas fuel flow rate Fng. From point h until point i, the controller 37 operates the gas turbine facility 100 in the mixed combustion mode in which both the natural gas and the ammonia gas are supplied to the combustors 3, and combusted.

At point i, the controller 37 makes the ammonia gas fuel flow rate Fag 0 (zero), and, from point i, operates the gas turbine facility 100 in the natural gas mono-fuel combustion mode in which only the natural gas is supplied to the combustors 3, and combusted.

At point i, the ammonia gas fuel flow rate Fag becomes 0 (zero), but there is a possibility that there is the ammonia gas remaining in the main fuel pipe 17 depicted in FIG. 1. Because of this, an operator closes the on-off valve 20 of the main fuel supply system S1 and the on-off valves 29 and 36 of the nitrogen gas supply system S4, and opens the on-off valves 26 and 30 of the nitrogen gas supply system S4. Thereafter, the operator operates the input apparatus 38, and causes the controller 37 to control the flow rate adjustment valve 24 and isolation valve 25 of the nitrogen gas supply system S4 to thereby supply the nitrogen gas to the main fuel pipe 17.

Thereby, the ammonia gas remaining in the main fuel pipe 17 is pushed into the combustors 3 by the nitrogen gas. This means that the ammonia gas is introduced to the combustors 3, but, at this time, the combustors 3 are stably performing combustion by using the natural gas. Because of this, the possibility of release of the high-concentration ammonia gas from the chimney 8 to the atmosphere due to combustion of the ammonia gas by the combustors 3 is low.

As depicted in FIG. 3, from point j, the controller 37 reduces the natural gas fuel flow rate Fng, and makes it 0 (zero) at point k. Thereby, at subsequent point l, the gas turbine GT is stopped.

The gas turbine facility 100 has various protection functionalities for minimizing damage of the gas turbine facility 100 when an abnormality such as a malfunction of equipment included in the gas turbine facility 100 has occurred.

For example, regarding fuels, if the pressure or temperature of a fuel decreases, this presumably causes abnormal combustion. Because of this, when a decrease of the pressure or temperature of a fuel is sensed, the controller 37 causes the isolation valves 13 and 19 to interrupt the supply of the fuels to the combustors 3, and emergently stops the gas turbine GT.

Figure 4:
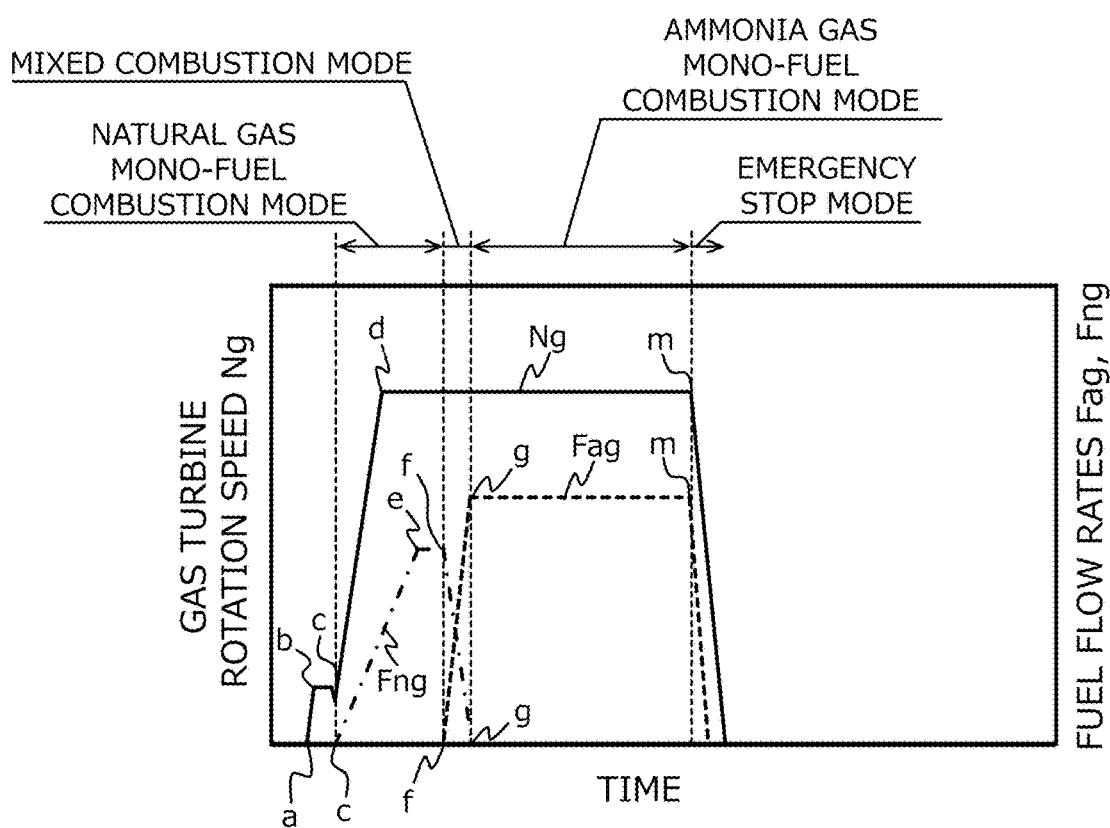
FIG. 4 is a figure depicting an example of temporal changes in the rotation speed of the gas turbine according to the first embodiment of the present invention and the fuel flow rates when the gas turbine is stopped emergently.

With reference to FIG. 4, an example of a method of emergently stopping the gas turbine GT according to the present embodiment is explained. FIG. 4 is a figure depicting an example of temporal changes in the rotation speed of the gas turbine GT according to the first embodiment of the present invention and the fuel flow rates when the gas turbine GT is stopped emergently.

Temporal changes until point g in FIG. 4 are the same as those in FIG. 3. As depicted in FIG. 4, the gas turbine facility 100 is operated in the ammonia gas mono-fuel combustion mode from point g. FIG. 4 depicts a situation where, at point m, the gas turbine GT is stopped emergently due to sensing of some abnormality (e.g. a decrease in the temperature of the fuels to a temperature equal to or lower than a threshold).

The controller 37, when an emergency stop condition mentioned later is satisfied, proceeds to an emergency stop mode, and causes the isolation valve 19 to start interruption of the supply of the ammonia gas to the combustors 3 (point m). When the supply of the ammonia gas is interrupted, the gas turbine GT stops.

Here, if the three-way valve 31 depicted in FIG. 1 keeps establishing communication between the main fuel pipe 17 and the main fuel supply pipe 15, the ammonia gas remaining in the main fuel pipe 17 is undesirably released to the outside of the gas turbine facility 100 through the combustors 3, the turbine 2, and the chimney 8.

In a case of large-scale power generation facilities, presumably, release of an ammonia gas is not likely to be a problem in many cases, due to diffusion to the atmosphere from a tall chimney. However, in a case of small-scale to middle-scale power generation facilities, it is desired to reduce release of an ammonia gas from a chimney as much as possible because those power generation facilities may be facilities adjacent to residential districts.

In view of this, the controller 37 of the gas turbine facility 100 according to the present embodiment switches the three-way valve 31 from the first position to the second position in conjunction with switching of the isolation valve 19 from the supply position to the interruption position accompanying an emergency stop of the gas turbine GT when a predetermined emergency stop condition is satisfied during operation in the ammonia gas mono-fuel combustion mode or the mixed combustion mode. When the three-way valve 31 is at the second position, the three-way valve 31 establishes communication between the main fuel pipe 17 and the fuel treating pipe 33, and interrupts communication between the main fuel pipe 17 and the main fuel supply pipe 15.

Figure 5:
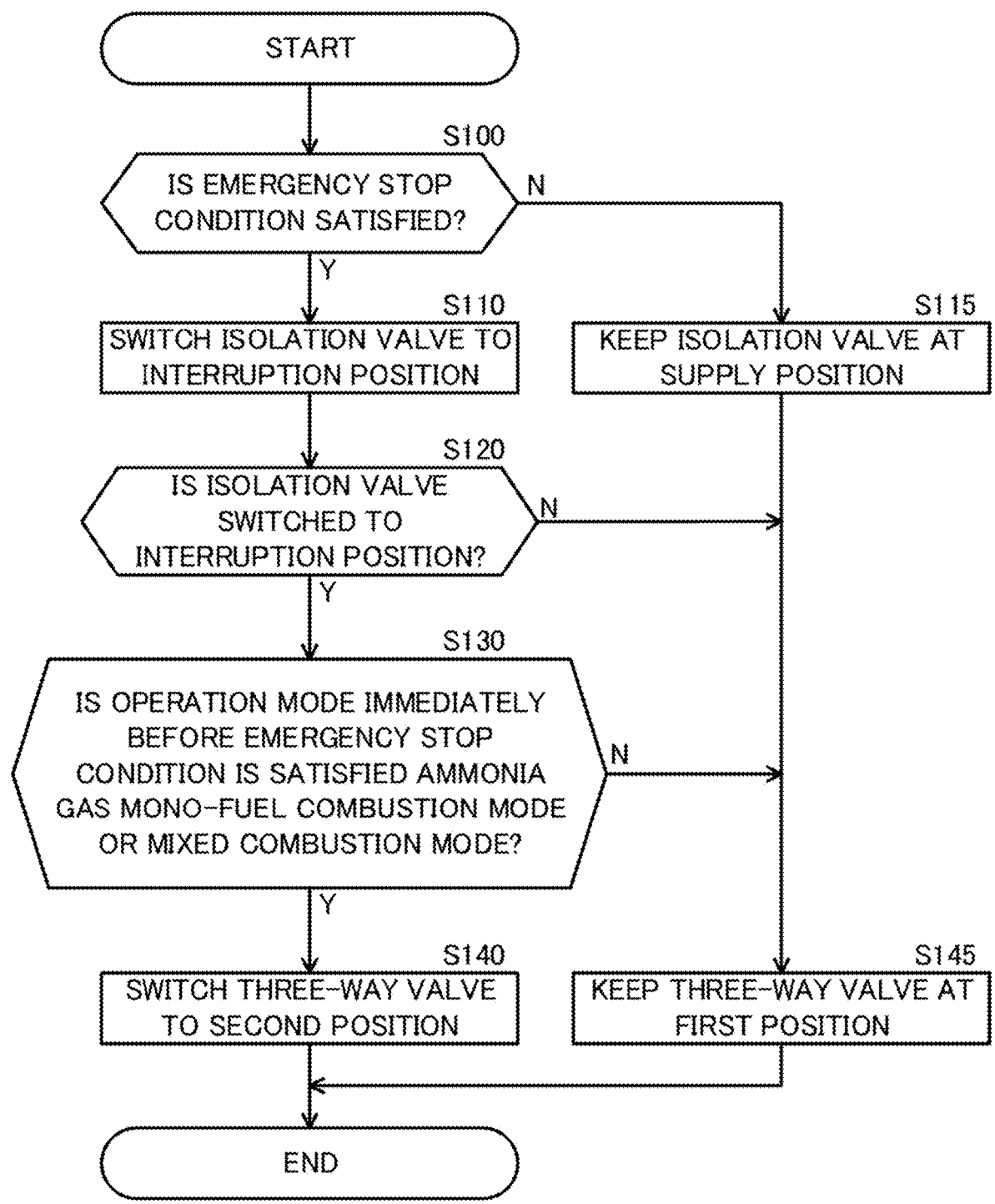
FIG. 5 is a flowchart depicting an example of the content of control of switching a three-way valve executed by a controller.

With reference to a flowchart in FIG. 5, an example of the content of control of switching the three-way valve 31 executed by the controller 37 according to the present embodiment is explained. Processes in the flowchart depicted in FIG. 5 are executed in control periods that are repeated at predetermined intervals during operation of the gas turbine facility 100.

The controller 37, by executing a program stored on the non-volatile memory 37b, functions as: a stop condition determining section (abnormality sensing section) that determines whether or not the emergency stop condition of the gas turbine GT is satisfied; a mode determining section that determines an operation mode; an isolation valve operation determining section that determines operation of the isolation valve 19; an isolation valve command section that outputs commands to the isolation valves 13 and 19 on the basis of results of the determinations by the stop condition determining section and the mode determining section; and a three-way valve command section that outputs a command to the three-way valve 31 on the basis of a result of the determination by the isolation valve operation determining section.

As depicted in FIG. 5, at Step S100, the controller 37 determines whether or not the emergency stop condition of the gas turbine GT is satisfied. That is, the controller 37 functions as the stop condition determining section. The emergency stop condition of the gas turbine GT is satisfied when a fuel low-temperature abnormality is sensed, for example.

The controller 37 determines whether or not a fuel temperature sensed by the fuel temperature sensor 17T is lower than a temperature threshold. Where the fuel temperature sensed by the fuel temperature sensor 17T is lower than the temperature threshold, the controller 37 determines that a fuel low-temperature abnormality is sensed. Where the fuel temperature sensed by the fuel temperature sensor 17T is equal to or higher than the temperature threshold, the controller 37 determines that a fuel low-temperature abnormality is not sensed. The temperature threshold is stored on the non-volatile memory 37b in advance.

When a fuel low-temperature abnormality is sensed at Step S100, the controller 37 determines that the emergency stop condition is satisfied, and proceeds to Step S110. When a fuel low-temperature abnormality is not sensed at Step S100, the controller 37 determines that the emergency stop condition is not satisfied, and proceeds to Step S115.

At Step S110, the controller 37 outputs, to the isolation valves 13 and 19, a command(s) for switching one of or both the isolation valves 13 and 19 to the interruption position(s), and proceeds to Step S120. Note that in the process at Step S110, it depends on the operation mode immediately before the emergency stop condition is satisfied whether one of or both the isolation valves 13 and 19 is or are controlled. Where the operation mode immediately before the emergency stop condition is satisfied is the ammonia gas mono-fuel combustion mode, the controller 37 switches the isolation valve 19 of the main fuel supply system S1 to the interruption position. Where the operation mode immediately before the emergency stop condition is satisfied is the natural gas mono-fuel combustion mode, the controller 37 switches the isolation valve 13 of the secondary fuel supply system S2 to the interruption position. Where the operation mode immediately before the emergency stop condition is satisfied is the mixed combustion mode, the controller 37 switches both the isolation valves 13 and 19 to the interruption positions.

At Step S115, the controller 37 outputs a command(s) for keeping one of or both the isolation valves 13 and 19 at the supply position(s) to the one of or both the isolation valves 13 and 19, and proceeds to Step S145. Note that in the process at Step S115, it depends on the currently-set operation mode whether one of or both the isolation valves 13 and 19 is or are controlled. Where the currently-set operation mode is the ammonia gas mono-fuel combustion mode, the controller 37 keeps the isolation valve 19 of the main fuel supply system S1 at the supply position. Where the currently-set operation mode is the natural gas mono-fuel combustion mode, the controller 37 keeps the isolation valve 13 of the secondary fuel supply system S2 at the supply position. Where the currently-set operation mode is the mixed combustion mode, the controller 37 keeps both the isolation valves 13 and 19 at the supply positions.

In this manner, the controller 37 functions as the isolation valve command section (isolation valve control section) that keeps one of or both the isolation valves 13 and 19 at the supply position(s) in a case where the emergency stop condition is not satisfied, and switches one of or both the isolation valves 13 and 19 to the interruption position(s) in a case where the emergency stop condition is satisfied.

At Step S120, the controller 37 determines whether or not the isolation valve 19 has been switched from the supply position to the interruption position. That is, the controller 37 functions as the isolation valve operation determining section that determines operation of the isolation valve 19.

If it is determined at Step S120 that the isolation valve 19 has been switched from the supply position to the interruption position, the process proceeds to Step S130. If it is determined at Step S120 that the isolation valve 19 has not been switched from the supply position to the interruption position, the process proceeds to Step S145.

At Step S130, the controller 37 determines which of the natural gas mono-fuel combustion mode, the mixed combustion mode, the ammonia gas mono-fuel combustion mode, and a non-combustion mode the operation mode immediately before the emergency stop condition is satisfied is. That is, the controller 37 functions as an operation mode determining section that determines the operation mode immediately before the emergency stop condition is satisfied. Note that the non-combustion mode is an operation mode in which none of the natural gas and the ammonia gas are supplied to the combustors 3. In the non-combustion mode, activation operation by the activation motor 9 or the like is performed.

If it is determined at Step S130 that the operation mode immediately before the emergency stop condition is satisfied is the ammonia gas mono-fuel combustion mode or the mixed combustion mode, the process proceeds to Step S140. If it is determined at Step S130 that the operation mode immediately before the emergency stop condition is satisfied is the natural gas mono-fuel combustion mode or the non-combustion mode, the process proceeds to Step S145.

At Step S140, the controller 37 outputs, to the three-way valve 31, a command for switching the three-way valve 31 from the first position to the second position. At Step S145, the controller 37 outputs, to the three-way valve 31, a command for keeping the three-way valve 31 at the first position. When the process at Step S140 or Step S145 ends, the processes depicted in flowchart in FIG. 5 in the present control period end.

In this manner, the controller 37 functions as the three-way valve command section (three-way valve control section) that keeps the three-way valve 31 at the first position when the isolation valve 19 is kept at the supply position during operation in the ammonia gas mono-fuel combustion mode or the mixed combustion mode, and switches the three-way valve 31 from the first position to the second position when the isolation valve 19 is switched from the supply position to the interruption position.

Accordingly, for example, as depicted in FIG. 4, where the gas turbine GT is stopped emergently for some reason when the gas turbine GT is being operated in the ammonia gas mono-fuel combustion mode, the three-way valve 31 is switched from the first position to the second position along with switching of the isolation valve 19 from the normal position to the interruption position. Thereby, the three-way valve 31 interrupts communication between the main fuel pipe 17 and the main fuel supply pipe 15 connected to the combustors 3, and establishes communication between the main fuel pipe 17 and the fuel treating pipe 33 connected to the water tank 32T of the fuel treating apparatus 32.

The ammonia gas remaining in the main fuel pipe 17 between the isolation valve 19 and the three-way valve 31 is introduced into the water tank 32T of the fuel treating apparatus 32 through the three-way valve 31 and the fuel treating pipe 33. The ammonia gas is dissolved into the water in the water tank 32T. The thus-treated ammonia water in the water tank 32T is managed not to have a concentration which is equal to or higher than a predetermined concentration.

According to the embodiment mentioned above, the following actions and advantages are attained.

(1) The gas turbine facility 100 includes: the main fuel pipe (fuel pipe) 17 connected to the main fuel supply facility (fuel supply facility) 16; the main fuel supply pipe (fuel supply pipe) 15 connected to the combustors 3 of the gas turbine GT; the fuel treating pipe 33 connected to the fuel treating apparatus 32 that treats a fuel; and the three-way valve 31 having the inlet port 31*i* connected to the main fuel pipe 17, the first outlet port 31*oa* connected to the main fuel supply pipe 15, and the second outlet port 31*ob* connected to the fuel treating pipe 33.

According to this configuration, by switching the three-way valve 31 at a time of an emergency stop of the gas turbine GT, the ammonia gas remaining in the main fuel pipe 17 can be introduced to the fuel treating apparatus 32, thus release of the ammonia gas to the atmosphere can be reduced effectively. In addition, simply switching the three-way valve 31 can interrupt communication between the main fuel pipe 17 and the main fuel supply pipe 15, and also establish communication between the main fuel pipe 17 and the fuel treating pipe 33. Because of this, it is not necessary to install a plurality of switching valves for switching communication and interruption of the pipes 15, 17, and 33. It is difficult to install a plurality of switching valves near the gas turbine GT in some cases. In contrast to this, according to the present embodiment, the three-way valve 31 can be installed near the gas turbine GT easily. As a result, the length of the main fuel supply pipe 15 can be reduced, thus the amount of release of the ammonia gas remaining in the main fuel supply pipe 15 to the atmosphere at a time of an emergency stop of the gas turbine GT can be kept small.

(2) The gas turbine facility 100 includes the flow rate adjustment valve 18 that is provided on the main fuel pipe 17, and adjusts the flow rate of a fuel supplied to the combustors 3. The three-way valve 31 is provided between the flow rate adjustment valve 18 and the combustors 3. According to this configuration, the length of the main fuel supply pipe 15 can be reduced as compared to a case where the three-way valve 31 is provided upstream of the flow rate adjustment valve 18, and the amount of release of the ammonia gas to the atmosphere can be kept small.

(3) The three-way valve 31 is arranged inside the enclosure 101 that houses the gas turbine GT. According to this configuration, the length of the main fuel supply pipe 15 can be reduced as compared to a case where the three-way valve 31 is arranged outside the enclosure 101, and the amount of release of the ammonia gas to the atmosphere can be kept small. Note that, where it is difficult to install the three-way valve 31 inside the enclosure 101, the length of the main fuel supply pipe 15 can be reduced by installing the three-way valve 31 adjacent to the enclosure 101, and the amount of release of the ammonia gas to the atmosphere can be kept small.

(4) The gas turbine facility 100 includes: the isolation valve 19 that is provided between the main fuel supply facility 16 and the flow rate adjustment valve 18 on the main fuel pipe 17, and has the supply position for supplying the fuel from the main fuel supply facility 16 to the combustors 3 and the interruption position for interrupting the supply of the fuel from the main fuel supply facility 16 to the combustors 3; and the controller 37 that controls the isolation valve 19 and the three-way valve 31. The controller 37 switches the isolation valve 19 from the supply position to the interruption position, and also switches the three-way valve 31 from the first position for establishing communication between the main fuel pipe 17 and the main fuel supply pipe 15 to the second position for establishing communication between the main fuel pipe 17 and the fuel treating pipe 33.

Due to this configuration, the supply of the ammonia gas (fuel) to the gas turbine GT can be interrupted by the isolation valve 19, and also the ammonia gas remaining in the main fuel pipe 17 (uncombusted fuel) can be introduced to the fuel treating apparatus 32 through the three-way valve 31. As a result, as compared to a case where the three-way valve 31 starts being switched from the first position to the second position after switching of the isolation valve 19 to the interruption position has been ended (after the isolation valve 19 has been closed fully), the amount of release of the ammonia gas remaining in the main fuel pipe 17 (uncombusted fuel) to the atmosphere can be kept small.

(5) The fuel supplied from the main fuel supply facility 16 to the combustors 3 through the three-way valve 31 is the ammonia gas. The fuel treating apparatus 32 has the water tank 32T in which the water to be used for treatment of the ammonia gas introduced through the fuel treating pipe 33 is stored. According to this configuration, the ammonia gas is dissolved by the water in the water tank 32T of the fuel treating apparatus 32. The ammonia water generated by the fuel treating apparatus 32 is preserved appropriately in the water tank 32T.

(6) The gas turbine facility 100 includes: the main fuel supply system S1 including the main fuel supply facility 16 that is a fuel supply facility that supplies the ammonia gas as a fuel; and the secondary fuel supply system S2 including the secondary fuel supply facility 10 that supplies the natural gas as a fuel.

The controller 37 operates the gas turbine GT in a plurality of operation modes. The plurality of operation modes includes: the ammonia gas mono-fuel combustion mode in which the fuel from the main fuel supply system S1 of either the main fuel supply system S1 or the secondary fuel supply system S2 is combusted in the combustors 3; the natural gas mono-fuel combustion mode in which the fuel from the secondary fuel supply system S2 of either the main fuel supply system S1 or the secondary fuel supply system S2 is combusted in the combustors 3; and the mixed combustion mode in which the fuels from both the main fuel supply system S1 and the secondary fuel supply system S2 are combusted in the combustors 3.

The controller 37 switches, where the predetermined emergency stop condition is satisfied during operation in the ammonia gas mono-fuel combustion mode or the mixed combustion mode, the isolation valve 19 from the supply position to the interruption position, and also switches the three-way valve 31 from the first position to the second position. According to this configuration, when the gas turbine GT is stopped emergently when the ammonia gas is being supplied as a fuel to the combustors 3, operation of the three-way valve 31 can cause the ammonia gas in the main fuel pipe 17 to be appropriately introduced to the fuel treating apparatus 32.

(7) The gas turbine facility 100 includes the nitrogen gas supply system S4 that supplies the nitrogen gas to the main fuel supply system S1 and the secondary fuel supply system S2. According to this configuration, when the operation mode is to be switched, the gas turbine GT is to be stopped, and so on, it is possible to replace a fuel remaining in pipes of the main fuel supply system S1 and the secondary fuel supply system S2 with the nitrogen gas.

(8) The gas turbine facility 100 includes the water supply system S5 having at least either of: an ammonia water supply system having the water supply pipe 51 that supplies the ammonia water in the water tank 32T of the fuel treating apparatus 32 to the combustors 3, and the spray nozzles 49 that spray the ammonia water supplied from the water supply pipe 51 to the combustors 3; and an ammonia water supply system having the water supply pipe 51s that supplies the ammonia water in the water tank 32T of the fuel treating apparatus 32 to the casings 3s, and the spray nozzles 49s that spray the ammonia water supplied from the water supply pipe 51s into the casings 3s. Where treatment of the ammonia water in the water tank 32T is entrusted to an industrial waste treating company, and the ammonia water is appropriately treated at an industrial waste treating facility, disposal costs arise. According to this configuration, energy can be used effectively by spraying the ammonia water in the water tank 32T into the combustors 3 or the casings 3s. In addition, the amount of the ammonia water to be disposed of can be reduced, thus disposal costs can be reduced.

Timings for spraying the ammonia water are explained. Where the ammonia water is to be sprayed from the spray nozzles 49, the ammonia water is preferably sprayed in the natural gas mono-fuel combustion mode. The combustors 3 to combust the ammonia gas supply the fuel and air separately to the inner cylinders (liners) 40, and perform the combustion by diffusion combustion in many cases. In the diffusion combustion, the fuel temperature becomes high locally, and a lot of nitrogen oxides are generated. Because of this, temperature increase in flames is prevented by spraying the ammonia water from the spray nozzles 49, and an advantage of reducing generation of nitrogen oxides can be expected. Note that ammonia easily dissolves into water. Because of this, if the ammonia water is sprayed from the spray nozzles 49 at a time of ammonia combustion, the ammonia gas dissolves into the ammonia water, and presumably this influences the combustion performance.

Accordingly, at a time of ammonia combustion, the ammonia water is preferably sprayed from the spray nozzles 49s installed in the casings 3s. The ammonia water sprayed into the casings 3s evaporates before it reaches the burners 41 of the combustors 3, thus presumably this influences combustion characteristics of the ammonia combustion less.

First Modification Example of First Embodiment

Whereas it is determined whether or not the isolation valve 19 has been switched from the supply position to the interruption position, and the three-way valve 31 is switched to the second position when the isolation valve 19 has been switched from the supply position to the interruption position in the example explained in the first embodiment (see FIG. 5), the present invention is not limited to this. The controller 37 may switch the isolation valve 19 and the three-way valve 31 simultaneously when the emergency stop condition of the gas turbine GT is satisfied.

Figure 6:
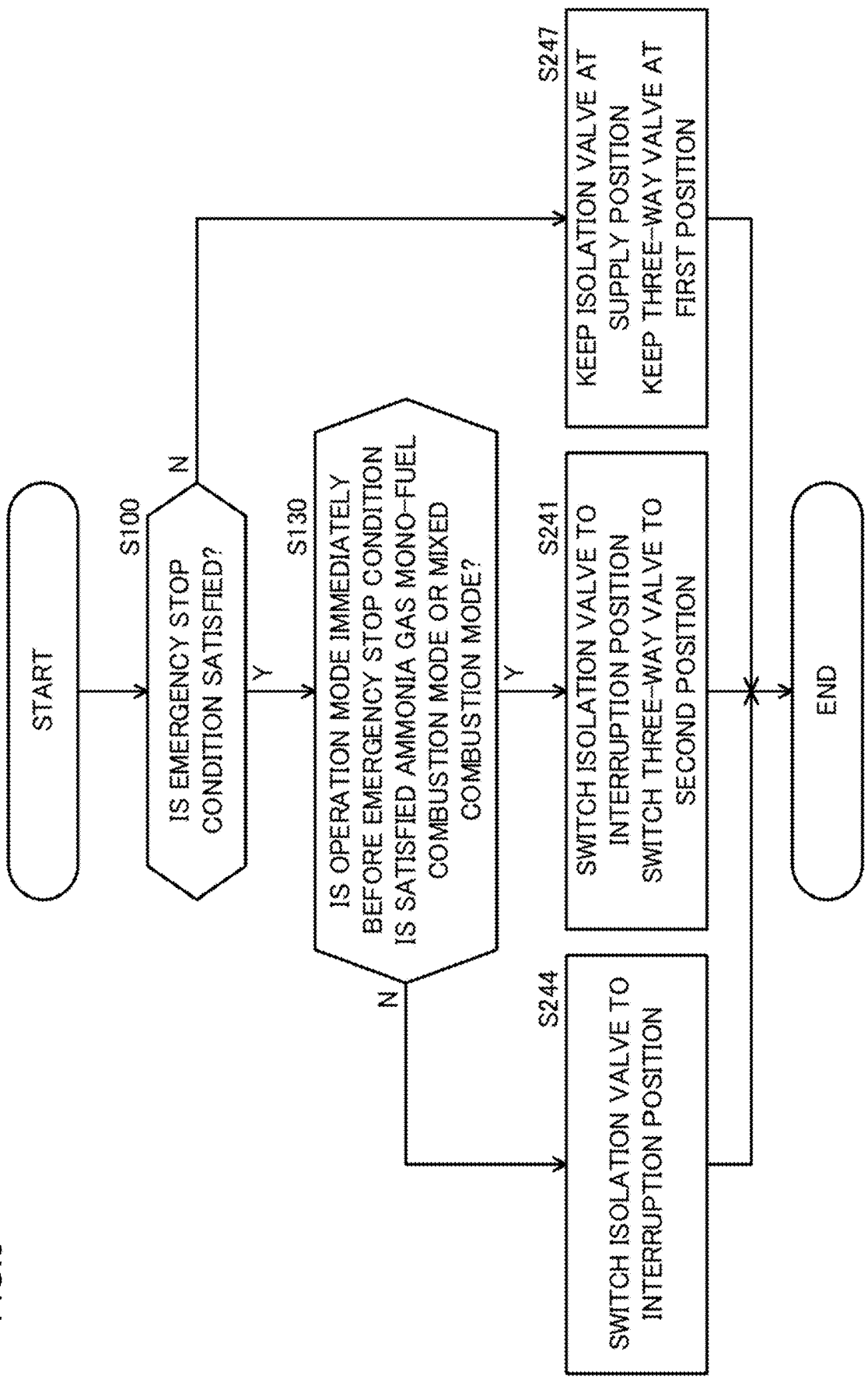
FIG. 6 is a flowchart depicting another example of the content of the control of switching the three-way valve executed by the controller.

FIG. 6 is a flowchart depicting another example of the content of the control of switching the three-way valve 31 executed by the controller 37. In the flowchart in FIG. 6, instead of the processes at Steps S110, S115, S120, S140, and S145 in the flowchart in FIG. 5, processes at Steps S241, S244, and S247 are executed. Processes in the flowchart depicted in FIG. 6 are executed in control periods that are repeated at predetermined intervals during operation of the gas turbine facility 100.

Processes at Steps S100 and S130 in FIG. 6 are processes similar to Steps S100 and S130 in FIG. 5. As depicted in FIG. 6, if it is determined at Step S100 that the emergency stop condition is satisfied, the process proceeds to Step S130, and if it is determined that the emergency stop condition is not satisfied, the process proceeds to Step S247.

If it is determined at Step S130 that the operation mode immediately before the emergency stop condition is satisfied is the ammonia gas mono-fuel combustion mode or the mixed combustion mode, the process proceeds to Step S241. If it is determined at Step S130 that the operation mode immediately before the emergency stop condition is satisfied is the natural gas mono-fuel combustion mode or the non-combustion mode, the process proceeds to Step S244.

At Step S241, the controller 37 outputs, to the isolation valve 19, a command for switching the isolation valve 19 to the interruption position, and also outputs, to the three-way valve 31, a command for switching the three-way valve 31 to the second position. In addition, where it is determined at Step S130 that the operation mode immediately before the emergency stop condition is satisfied is the mixed combustion mode, at Step S241, the controller 37 outputs, to the isolation valve 13, a command for switching the isolation valve 13 of the secondary fuel supply system S2 to the interruption position.

Where it is determined at Step S130 that the operation mode immediately before the emergency stop condition is satisfied is the natural gas mono-fuel combustion mode, at Step S244, the controller 37 outputs, to the isolation valve 13, a command for switching the isolation valve 13 of the secondary fuel supply system S2 to the interruption position.

At Step S247, the controller 37 outputs, to one of or both of the isolation valves 13 and 19, a command(s) for keeping the one of or both of the isolation valves 13 and 19 at the supply position(s), and also outputs, to the three-way valve 31, a command for keeping the three-way valve 31 at the first position. Note that in the process at Step S247, it depends on the currently-set operation mode whether one of or both of the isolation valves 13 and 19 is or are controlled.

Where the currently-set operation mode is the ammonia gas mono-fuel combustion mode, the controller 37 keeps the isolation valve 19 of the main fuel supply system S1 at the supply position. Where the currently-set operation mode is the natural gas mono-fuel combustion mode, the controller 37 keeps the isolation valve 13 of the secondary fuel supply system S2 at the supply position. Where the currently-set operation mode is the mixed combustion mode, the controller 37 keeps both of the isolation valves 13 and 19 at the supply positions.

In this manner, similarly to the embodiment described above, the controller 37 according to the present modification example switches the isolation valve 19 to the interruption position, and also switches the three-way valve 31 to the second position in a case where the emergency stop condition is satisfied, and additionally the operation mode immediately before the emergency stop condition is satisfied is a mode in which the main fuel (ammonia gas) is being combusted in the combustors 3 (the ammonia gas mono-fuel combustion mode or the mixed combustion mode).

According to the present modification example, actions and advantages similar to those of the embodiment described above can be attained. Note that whereas, in the embodiment described above and the present modification example, the examples are explained in which controlling of the operation of the isolation valve 19 and the three-way valve 31 is performed by taking into consideration a result of the determination of the operation mode when the emergency stop condition is satisfied, the present invention is not limited to this. The controller 37 may output, to the isolation valve 19, a command for switching the isolation valve 19 to the interruption position, and also output, to the three-way valve 31, a command for switching the three-way valve 31 to the second position when the emergency stop condition is satisfied.

Second Modification Example of First Embodiment

Whereas the emergency stop condition of the gas turbine GT is satisfied when a fuel low-temperature abnormality is sensed in the example explained in the first embodiment, the present invention is not limited to this.

The controller 37 may determine that the emergency stop condition is satisfied when a combustion abnormality of the combustors 3 is sensed. The gas turbine GT is provided with a plurality of combustion temperature sensors in the circumferential direction in a circular flow path located downstream of the turbine 2. The combustion temperature sensors sense a temperature distribution in the circumferential direction of exhaust gas temperatures of the gas turbine GT. The combustion temperature sensors are thermocouples or the like that sense the temperatures (combustion temperatures) of the exhaust gas from the combustors 3, and output signals representing sensing results to the controller 37. The controller 37 acquires the exhaust gas temperatures by using the plurality of combustion temperature sensors, and computes the average value of the exhaust gas temperatures of the plurality of combustion temperature sensors. The controller 37 compares the computed average value with each of the exhaust gas temperatures of the plurality of combustion temperature sensors. Where a temperature deviation which is a value obtained by subtracting an exhaust gas temperature of a combustion temperature sensor from the computed average value is equal to or greater than a deviation threshold, the controller 37 determines that an combustion abnormality such as flame loss is sensed at a combustor 3 corresponding to the position. In addition, the controller 37 may compare temperature changes in the combustion temperature sensors with other operation data, and determine that a combustion abnormality is sensed.

In addition, the gas turbine GT is provided with combustion temperature sensors that sense combustion temperatures of the plurality of combustors 3. The combustion temperature sensors are thermocouples or the like that sense temperatures of the burners 41 of the combustors 3. Where a value of a combustion temperature sensor of a burner 41 is equal to or lower than a threshold, the controller 37 determines that a combustion abnormality such as flame loss is sensed at the combustor 3.

In this manner, in configuration in which the combustion states of the combustors 3 are sensed directly on the basis of sensing results of the combustion temperature sensors, presumably it becomes possible to reduce a delay that can be generated at a time of an emergency stop of the gas turbine GT.

In addition, the controller 37 may determine that the emergency stop condition is satisfied when a fuel low-pressure abnormality in which a fuel pressure becomes lower than a pressure threshold is sensed. The controller 37 may determine that the emergency stop condition is satisfied when an exhaust gas high-temperature abnormality in which the temperature of the exhaust gas 7 becomes higher than a high temperature threshold is sensed. The controller 37 may determine that the emergency stop condition is satisfied when an exhaust gas low-temperature abnormality in which the temperature of the exhaust gas 7 becomes lower than a low-temperature threshold is sensed. The controller 37 may determine that the emergency stop condition is satisfied in a case where an exhaust gas temperature deviation abnormality in which an exhaust gas temperature deviation becomes greater than a deviation threshold is sensed.

The controller 37 may determine that the emergency stop condition is satisfied when an operation abnormality of the flow rate adjustment valve 18 is sensed. The controller 37 may determine that the emergency stop condition is satisfied when a shaft vibration abnormality is sensed in which a shaft vibration value of the gas turbine GT becomes greater than a vibration threshold. Furthermore, the controller 37 may determine that the emergency stop condition is satisfied when a following abnormality, a fuel leakage, a fire, or the like of a flow rate adjustment valve that adjusts the flow rate of a fuel is detected.

Where it can be assumed that a plurality of abnormalities related to whether or not the emergency stop condition is satisfied, the controller 37 determines that the emergency stop condition is satisfied when at least one of the plurality of abnormalities is sensed. In addition, the controller 37 determines that the emergency stop condition is not satisfied when all of the plurality of abnormalities are not sensed.

Note that the abnormality sensing method is not limited to one that is performed by using one parameter. For example, an abnormality of a fuel supplied to the combustors 3 may be sensed on the basis of sensing results of the inlet pressure sensor 17Pa, the outlet pressure sensor 17Pb, and the fuel temperature sensor 17T.

Third Modification Example of First Embodiment

Whereas the three-way valve 31 is switched from the first position to the second position at a time of an emergency stop of the gas turbine GT in the example explained in the first embodiment, timings at which the three-way valve 31 is switched from the first position to the second position are not limited to only a time of an emergency stop.

For example, where a leak check of the main fuel pipe 17 and the fuel treating pipe 33 depicted in FIG. 1 is performed, an operator closes the on-off valve 34, operates the input apparatus 38, and causes the controller 37 to switch the three-way valve 31 to the second position. Thereafter, the ammonia gas is supplied from the main fuel supply facility 16 to the main fuel pipe 17. Thereby, the ammonia gas is supplied from the main fuel pipe 17 to the fuel treating pipe 33 through the three-way valve 31. After the leak check is completed, the operator closes the on-off valve 20, and opens the on-off valve 34. Thereby, the ammonia gas in the main fuel pipe 17 and the fuel treating pipe 33 is introduced to the fuel treating apparatus 32.

Second Embodiment

Figure 7:
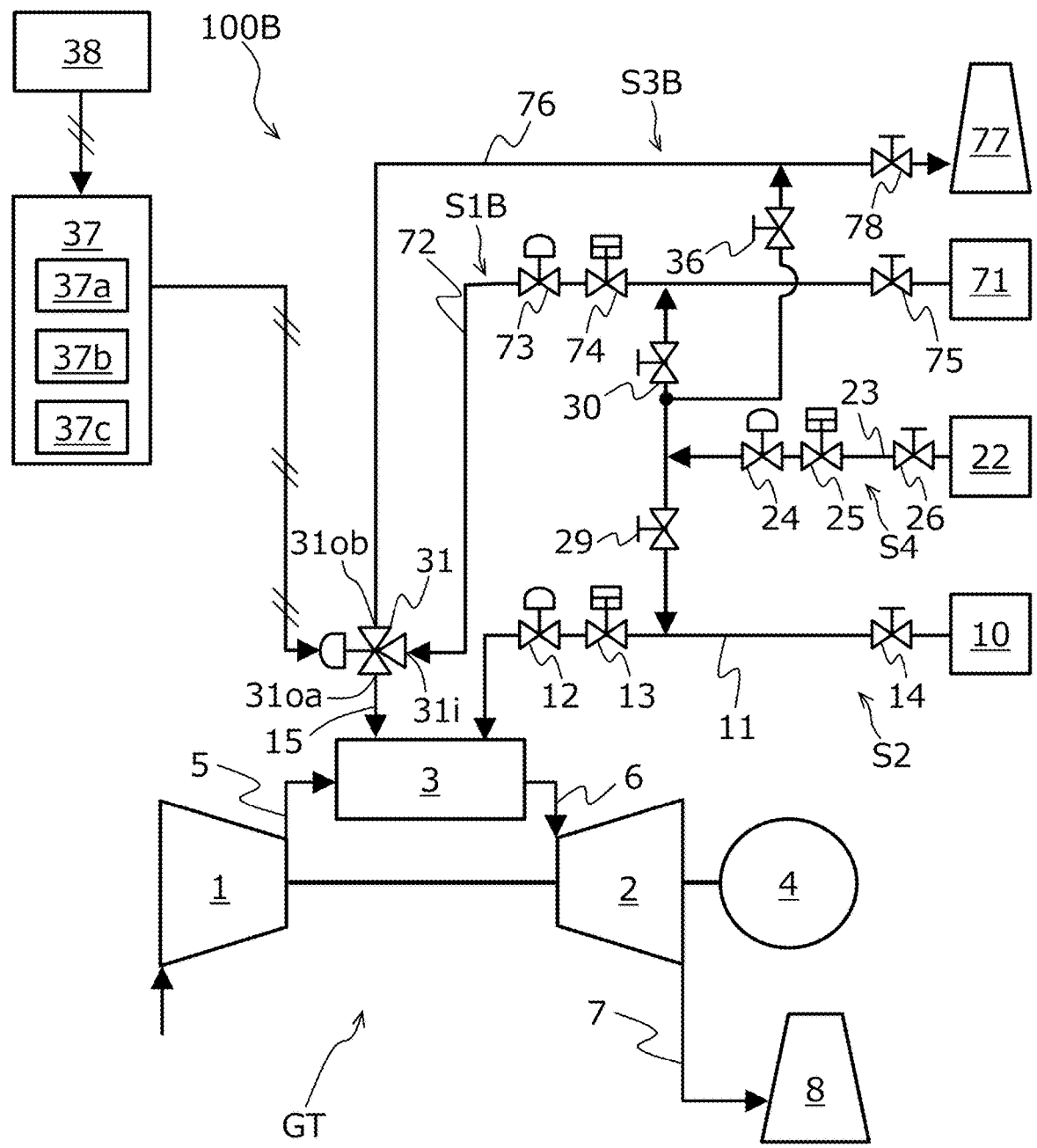
FIG. 7 is a schematic figure depicting the configuration of a gas turbine facility according to a second embodiment of the present invention.

With reference to FIG. 7, a gas turbine facility 100B according to a second embodiment of the present invention is explained. FIG. 7 is a schematic figure depicting the configuration of the gas turbine facility 100B according to the second embodiment of the present invention. Note that configurations identical or equivalent to configurations explained in the first embodiment are given identical reference numerals, and mainly differences are explained. Note that although the enclosure 101 is omitted in FIG. 7, the three-way valve 31 is arranged inside the enclosure 101 similarly to the first embodiment.

In the method explained in the first embodiment, release of the ammonia gas to the atmosphere at a time of an emergency stop of the gas turbine GT is reduced in the gas turbine facility 100 that operates the gas turbine GT by using the ammonia gas as a fuel. In contrast to this, instead of the ammonia gas explained in the first embodiment, the gas turbine facility 100B that operates the gas turbine GT by supplying a hydrogen gas as the main fuel to the combustors 3 is explained in the present second embodiment. It is known that where a hydrogen gas is used as a main fuel, generation of carbon dioxide can be reduced similarly to the ammonia gas.

Meanwhile, at a gas turbine facility that operates the gas turbine GT by using a hydrogen gas as a fuel, it is desired to appropriately treat the hydrogen gas at a time of an emergency stop of the gas turbine GT. A flow path located downstream of the combustors 3 in the gas turbine GT has a complicated shape in many cases. When the gas turbine GT is stopped emergently, the supply of air to the combustors 3 is interrupted also, thus there is a possibility the hydrogen gas keeps staying in the gas turbine GT. The larger the amount of the hydrogen gas remaining in a pipe connected to the combustors 3 is when the gas turbine GT is stopped emergently, the more likely the hydrogen gas stays still in the flow path in the gas turbine GT. If the hydrogen gas with a large flammable range is staying still in the gas turbine GT, there is a fear that the hydrogen gas is ignited at an unintended location, and constituent parts of the gas turbine GT are damaged undesirably.

In view of this, in the configuration in the present second embodiment, the likelihood that the hydrogen gas remaining in a pipe flows into the gas turbine GT at a time of an emergency stop of the gas turbine GT is reduced, and the hydrogen gas is prevented from staying still in the gas turbine GT. Details are explained below.

The gas turbine facility 100B according to the second embodiment is provided with a main fuel supply system S1B, instead of the main fuel supply system S1 explained in the first embodiment. The main fuel supply system S1B is a system that supplies the hydrogen gas as the main fuel to the combustors 3. The main fuel supply system S1B has: a main fuel supply facility 71; a main fuel pipe 72 connected to the main fuel supply facility 71 and the inlet port 31i of the three-way valve 31; and an on-off valve 75, an isolation valve 74, and a flow rate adjustment valve 73 that are provided on the main fuel pipe 72.

The main fuel supply facility 71 includes: a tank (not depicted) that stores a liquid hydrogen; a pump (not depicted) that pumps the liquid hydrogen; and a vaporizer (not depicted) that vaporizes the liquid hydrogen pressurized by the pump. The hydrogen gas generated by the vaporizer is supplied to the main fuel pipe 17. The hydrogen gas supplied to the main fuel pipe 17 is supplied to the combustors 3 through the three-way valve 31.

The on-off valve 75, the isolation valve 74, and the flow rate adjustment valve 73 are provided in this order from the upstream side toward the downstream side of the main fuel pipe 72 through which the main fuel is supplied from the main fuel supply facility 71. The on-off valve 75 is a manual valve that can open and close the main fuel pipe 72.

The isolation valve 74 is a control valve that can open and close the main fuel pipe 72 according to a signal from the controller 37. The flow rate adjustment valve 73 is a control valve that controls the flow rate of the main fuel passing through the flow rate adjustment valve 73, that is, the flow rate of the fuel (hydrogen gas) supplied to the combustors 3, by adjusting the opening area of the main fuel pipe 72 according to a signal from the controller 37.

A fuel treating system S3B has: a fuel treating apparatus 77; a fuel treating pipe 76 connected to the second outlet port 31ob of the three-way valve 31; and an on-off valve 78 provided on the fuel treating pipe 76. The on-off valve 78 is a manual valve that can open and close the fuel treating pipe 76.

The fuel treating apparatus 77 is an afterburner that combusts the hydrogen gas, for example. The fuel treating apparatus 77 may be a chimney that releases the hydrogen gas to the atmosphere. The hydrogen gas is introduced to the fuel treating apparatus 77 through the fuel treating pipe 76. When the hydrogen gas is introduced to the fuel treating apparatus 77, the fuel treating apparatus 77 appropriately treats the hydrogen gas.

The gas turbine facility 100B includes, similarly to the first embodiment, the nitrogen gas supply system S4 that replaces, with nitrogen, the fuels remaining in the main fuel pipe 72, the secondary fuel pipe 11, and the fuel treating pipe 76.

An example of a method of operating the gas turbine GT according to the present second embodiment is explained. As mentioned above, in the gas turbine facility 100B according to the present second embodiment, the main fuel supplied from the main fuel supply facility 71 to the combustors 3 through the three-way valve 31 is a hydrogen gas. Hydrogen gases have a large flammable range as compared with natural gases, and there is a concern over re-ignition (explosion) in a flow path located downstream of combustors at a time of a failure of ignition in a gas turbine. Because of this, in the gas turbine facility 100B according to the present second embodiment, similarly to the first embodiment, the gas turbine GT is activated by using the natural gas, and thereafter the fuels are switched from the natural gas to the hydrogen gas in some cases. Note that the operation method to be performed when the gas turbine GT is to be stopped in the second embodiment is also similar to that in the first embodiment.

That is, in the gas turbine facility 100B, the gas turbine GT is activated by operation in the natural gas mono-fuel combustion mode, and from the natural gas mono-fuel combustion mode, the gas turbine facility 100B proceeds to a mixed combustion mode in which the hydrogen gas and the natural gas are combusted simultaneously by the combustors 3, and then to a hydrogen gas mono-fuel combustion mode in which only the hydrogen gas is combusted by the combustors 3. Where the gas turbine GT is to be stopped, from the hydrogen gas mono-fuel combustion mode, the gas turbine facility 100B proceeds to the mixed combustion mode, and then to the natural gas mono-fuel combustion mode.

Note that after proceeding to the natural gas mono-fuel combustion mode from the mixed combustion mode, an operator closes the on-off valve 75 of the main fuel supply system S1B and the on-off valves 29 and 36 of the nitrogen gas supply system S4, and opens the on-off valves 26 and 30 of the nitrogen gas supply system S4. Thereafter, the operator operates the input apparatus 38, and causes the controller 37 to control the flow rate adjustment valve 24 and isolation valve 25 of the nitrogen gas supply system S4 to thereby supply the nitrogen gas to the main fuel pipe 72. Thereby, the hydrogen gas remaining in the main fuel pipe 72 is replaced with the nitrogen gas.

The controller 37 according to the present second embodiment switches, similarly to the first embodiment, the isolation valve 74 from the supply position to the interruption position, and also switches the three-way valve 31 from the first position to the second position when the emergency stop condition is satisfied, and additionally the operation mode immediately before the emergency stop condition is satisfied is a mode in which the main fuel (hydrogen gas) is combusted in the combustors 3 (the hydrogen gas mono-fuel combustion mode or the mixed combustion mode).

Thereby, the supply of the fuel to the gas turbine GT is interrupted by the isolation valve 74, and also the hydrogen gas remaining in the main fuel pipe 72 is introduced to the fuel treating apparatus 77 through the three-way valve 31. The amount of the hydrogen gas flowing into the combustors 3 at a time of an emergency stop of the gas turbine GT can be kept small, thus the risk of ignition in the gas turbine GT can be reduced.

Note that the hydrogen gas remaining in the fuel treating pipe 76 is replaced with the nitrogen gas before the gas turbine GT is driven by using the hydrogen gas. Because of this, it is possible to prevent the hydrogen gas from igniting inside the fuel treating pipe 76.

Third Embodiment

Figure 8:
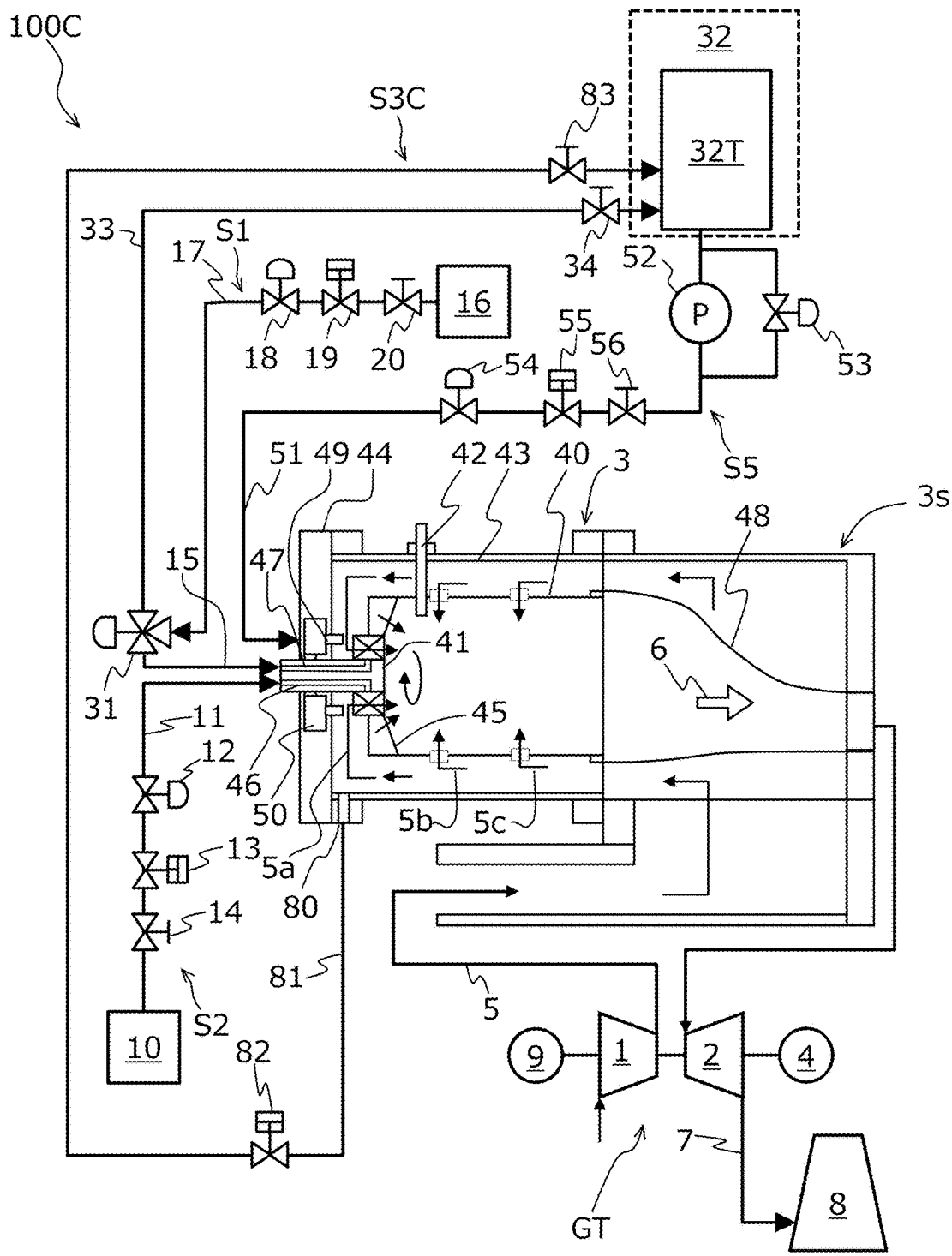
FIG. 8 is a schematic figure depicting the configuration of a gas turbine facility according to a third embodiment of the present invention.
Figure 9:
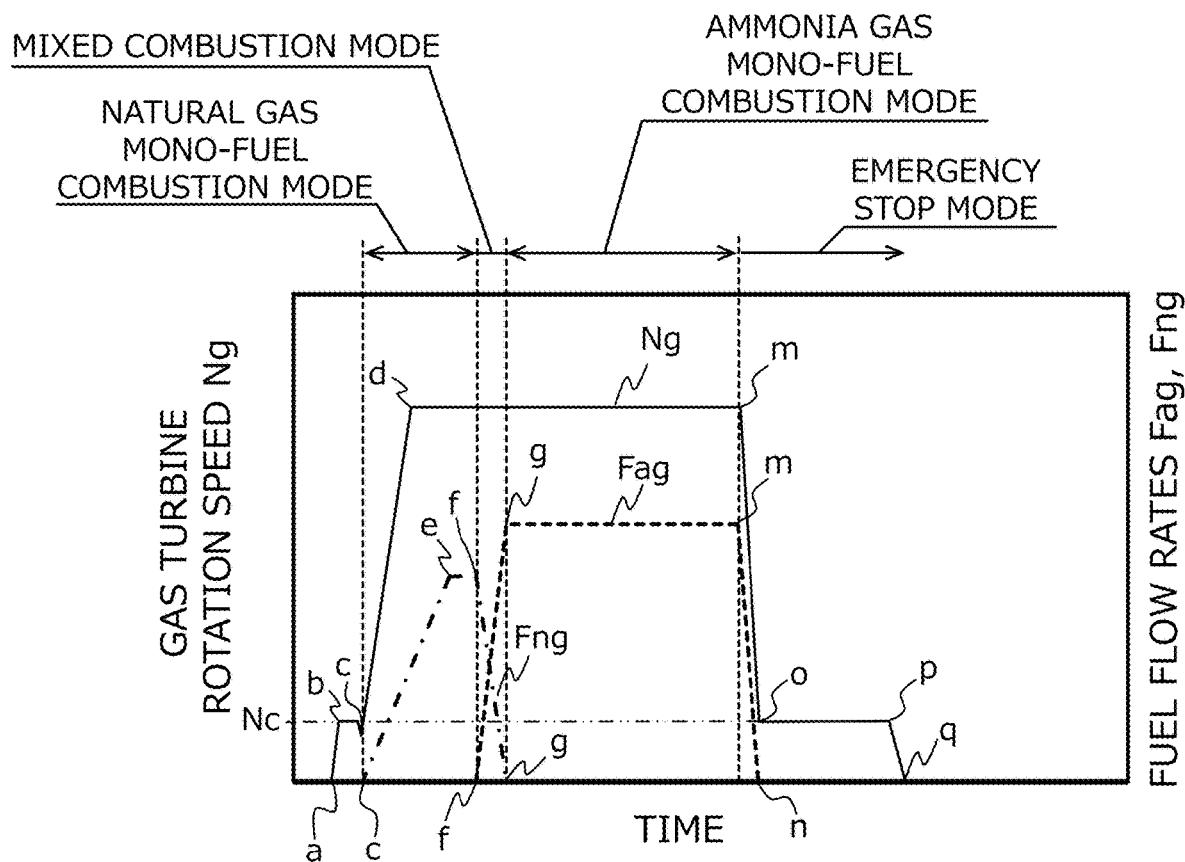
FIG. 9 is a figure depicting an example of temporal changes in the rotation speed of the gas turbine according to the third embodiment of the present invention and the fuel flow rates when the gas turbine is stopped emergently.
Figure 10:
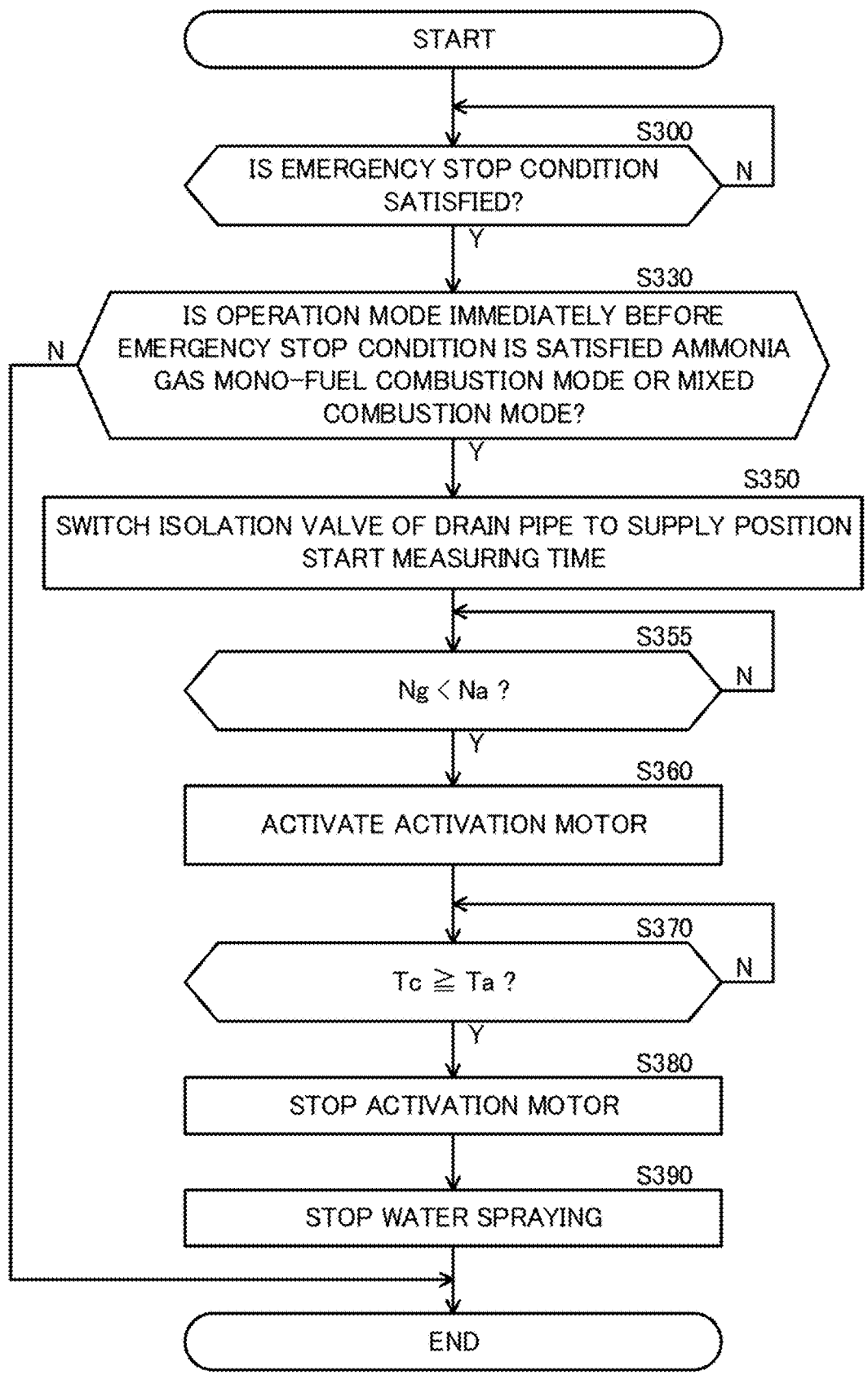
FIG. 10 is a flowchart depicting an example of the content of control of an activation motor, the water supply system, and the fuel treating system executed by the controller.

With reference to FIG. 8 to FIG. 10, a gas turbine facility 100C according to a third embodiment of the present invention is explained. FIG. 8 is a schematic figure depicting the gas turbine facility 100C according to the third embodiment of the present invention. The controller 37 is omitted in FIG. 8. Note that configurations identical or equivalent to configurations explained in the first embodiment are given identical reference numerals, and mainly differences are explained.

As depicted in FIG. 8, in addition to the fuel treating pipe 33 and the on-off valve 34 explained in the first embodiment, a fuel treating system S3C of the gas turbine facility 100C according to the third embodiment has: a drain pipe 81 connected to the combustors 3 and the fuel treating apparatus 32; and an isolation valve 82 and an on-off valve 83 provided on the drain pipe 81.

The drain pipe 81 is connected to a drain hole 80 formed through the outer cylinder 43 of each combustor 3. The drain hole 80 penetrates the outer cylinder 43 of the combustor 3, and establishes communication between the inside of the outer cylinder 43 and the drain pipe 81. Normally, a drain hole is not provided to a gas-firing combustor.

With reference to FIG. 9 to FIG. 10, an example of a method of emergently stopping the gas turbine GT according to the present third embodiment is explained. FIG. 9 is a figure that is similar to FIG. 4, and depicts an example of temporal changes in the rotation speed Ng of the gas turbine GT according to the third embodiment of the present invention and the fuel flow rates when the gas turbine GT is stopped emergently.

The controller 37 according to the first embodiment, when the emergency stop condition is satisfied, proceeds to the emergency stop mode and causes the isolation valve 19 to interrupt the supply of the ammonia gas to the combustors 3 (point m) as depicted in FIG. 4. Due to the interruption of the supply of the ammonia gas, the gas turbine GT stops. Due to the stop of the compressor 1, the supply of the compressed air 5 to the combustors 3 also is interrupted.

In contrast to this, as depicted in FIG. 9, the controller 37 according to the present third embodiment causes the activation motor 9 to rotate the gas turbine GT at a predetermined rotation speed for certain length of time after the emergency stop condition is satisfied during operation in the ammonia gas mono-fuel combustion mode or the mixed combustion mode. In addition, the controller 37 supplies the ammonia water in the water tank 32T to the spray nozzles 49 through the isolation valve 55 for a certain length of time after the emergency stop condition is satisfied during operation in the ammonia gas mono-fuel combustion mode or the mixed combustion mode, and sprays the ammonia water into the combustors 3 from the spray nozzles 49.

With reference to FIG. 10, an example of the content of control of the activation motor 9, the water supply system S5, and the fuel treating system S3C executed by the controller 37 is explained in detail. Note that a flowchart in FIG. 10 depicts extracted processes related to the control of the activation motor 9, the water supply system S5, and the fuel treating system S3C. Control of the isolation valve 19 of the main fuel supply system S1 and three-way valve 31 is similar to that in the first embodiment, and explanations thereof are omitted.

Processes in the flowchart depicted in FIG. 10 are executed in control periods that are repeated at predetermined intervals during operation of the gas turbine facility 100. As depicted in FIG. 10, at Step S300, the controller 37 determines, similarly to Step S100 in FIG. 5, whether or not the emergency stop condition is satisfied. If it is determined at Step S300 that the emergency stop condition is satisfied, the process proceeds to Step S330. The process at Step S300 is executed repeatedly until a result of the determination is Yes.

At Step S330, the controller 37 determines, similarly to Step S130 in FIG. 5, whether or not the operation mode immediately before the emergency stop condition is satisfied is the ammonia mono-fuel combustion mode or the mixed combustion mode.

If it is determined at Step S330 that the operation mode immediately before the emergency stop condition is satisfied is the ammonia gas mono-fuel combustion mode or the mixed combustion mode, the process proceeds to Step S350. If it is determined at Step S330 that the operation mode immediately before the emergency stop condition is satisfied is the natural gas mono-fuel combustion mode or the non-combustion mode, the processes depicted in the flowchart in FIG. 10 end.

At Step S350, the controller 37 switches the isolation valve 82 of the drain pipe 81 from the interruption position to the supply position, also starts measuring time and proceeds to Step S355.

At Step S355, the controller 37 determines whether or not the rotation speed Ng of the gas turbine GT sensed by the rotation speed sensor 2N is lower than a rotation speed threshold Na. If it is determined at Step S350 that the rotation speed Ng is lower than the rotation speed threshold Na, the process proceeds to Step S360. The process at Step S355 is executed repeatedly until a result of the determination is Yes.

At Step S360, the controller 37 activates the activation motor 9, starts operation control of the activation motor 9 and proceeds to Step S370. Thereby, rotation torque is applied to the gas turbine GT. The controller 37 controls operation of the activation motor 9 such that the rotation speed Ng of the gas turbine GT is kept constant.

At Step S370, the controller 37 determines whether or not time Tc having started being measured at Step S350 is equal to or longer than a time threshold Ta. The time threshold Ta is stored on the non-volatile memory 37b of the controller 37 in advance.

If it is determined at Step S370 that the time Tc is equal to or longer than the time threshold Ta, the process proceeds to Step S380. The process at Step S370 is executed repeatedly until a result of the determination is Yes.

At Step S380, the controller 37 stops operation of the activation motor 9, and proceeds to Step S390. Thereby, the rotation speed Ng of the gas turbine GT lowers, and the gas turbine GT stops.

At Step S390, the controller 37 switches the isolation valve 55 of the water supply system S5 from the supply position to the interruption position, and ends the processes depicted in the flowchart in FIG. 10. Thereby, water spraying into the combustors 3 by the water supply system S5 stops.

In this manner, regarding the operation mode, the controller 37 according to the present third embodiment proceeds to the emergency stop mode when the emergency stop condition is satisfied during operation in the ammonia gas mono-fuel combustion mode or the mixed combustion mode. When the controller 37 proceeds to the emergency stop mode, similarly to the embodiment described above, the controller 37 switches the isolation valve 19 from the supply position to the interruption position, and also switches the three-way valve 31 from the first position to the second position.

As depicted in FIG. 9, when a command for switching the isolation valve 19 to the interruption position is output from the controller 37 at point m, the ammonia gas fuel flow rate Fag and the rotation speed Ng of the gas turbine lower rapidly. At point n, the ammonia gas fuel flow rate Fag becomes 0 (zero) due to interruption by the isolation valve 19.

The controller 37 monitors the rotation speed Ng of the gas turbine GT, and, where the rotation speed Ng decreases to be lower than the rotation speed threshold Na, drives the activation motor 9, and causes the activation motor 9 to apply rotation torque to the gas turbine GT (point o). The controller 37 controls operation of the activation motor 9 such that the rotation speed Ng of the gas turbine GT is kept at a constant value (e.g. Nc) from point o until point p. After the time Tc since the emergency stop condition is satisfied becomes longer than a certain length of time Ta, the controller 37 stops operation of the activation motor 9 (point p).

By stopping operation of the activation motor 9, the rotation speed Ng of the gas turbine GT lowers, and becomes 0 (zero) at point q.

In this manner, when the controller 37 according to the present third embodiment switches the isolation valve 19 from the supply position to the interruption position, and also switches the three-way valve 31 from the first position to the second position, the controller 37 causes the activation motor 9 to rotate the gas turbine GT for a certain length of time, and causes the compressor 1 to supply air to the combustors 3 and the turbine 2. Thereby, the ammonia gas remaining in the gas turbine GT can be diluted, and the concentration can be lowered. As a result, the ammonia concentration of a gas discharged from the chimney 8 can be lowered, thus occurrences of odor can be reduced effectively.

In addition, the controller 37 according to the present third embodiment continues spraying of the ammonia water from the spray nozzles 49 even after the emergency stop condition is satisfied, and the controller 37 proceeds to the emergency stop mode. Thereby, it is possible to dissolve the ammonia gas remaining in each combustor 3 in the water sprayed from the spray nozzles 49. The ammonia water injected into the inner cylinder 40 of the combustor 3, and having absorbed the ammonia gas in the combustor 3 flows from openings of the inner cylinder 40 into a circular flow path between the outer cylinder 43 and the inner cylinder 40, and is discharged to the drain pipe 81 through the drain hole 80. The ammonia water discharged to the drain pipe 81 is recovered in the water tank 32T of the fuel treating apparatus 32.

Accordingly, according to the present third embodiment, the amount of the ammonia gas discharged from the chimney 8 can be reduced more than in the first embodiment.

First Modification Example of Third Embodiment

Similarly to the second modification example according to the first embodiment, in the third embodiment also, where it can be assumed that a plurality of abnormalities related to whether or not the emergency stop condition is satisfied, the controller 37 determines that the emergency stop condition is satisfied when at least one of the plurality of abnormalities is sensed. In addition, the controller 37 determines that the emergency stop condition is not satisfied when all of the plurality of abnormalities are not sensed.

Note that where a shaft vibration abnormality in which the shaft vibration value of the gas turbine GT becomes higher than a threshold is sensed, there is a fear that damage may be caused to the gas turbine GT if the activation motor 9 keeps the rotation speed Ng of the gas turbine GT for a certain length of time when the gas turbine GT is stopped emergently. Because of this, the controller 37 preferably does not execute control of activating the activation motor 9 in the emergency stop mode when a shaft vibration abnormality is sensed.

Second Modification Example of Third Embodiment

The flow of control of the activation motor 9, the fuel treating system S3C, and the water supply system S5 in the emergency stop mode is not limited to the flow depicted in the flowchart in FIG. 10. For example, whereas the activation motor 9 is stopped, and also water spraying by the water supply system S5 is stopped when the time Tc since the emergency stop condition is satisfied becomes longer than the time threshold Ta in the example explained in the third embodiment, a timing at which the activation motor 9 is stopped, and a timing at which water spraying is stopped may be made different from each other. The controller 37 may stop the activation motor 9 when the time Tc becomes longer than a first time threshold Ta1, and stop water spraying when the time Tc becomes longer than a second time threshold Ta2. Alternatively, it is also possible that water is not sprayed depending on the operation state in some cases.

In addition, whereas time since the emergency stop condition is satisfied is measured in the example explained in the third embodiment, the present invention is not limited to this. The controller 37 may measure time since the activation motor 9 is activated, compare the time with a time threshold and decide a timing at which the activation motor 9 is to be stopped.

Fourth Embodiment

Figure 11:
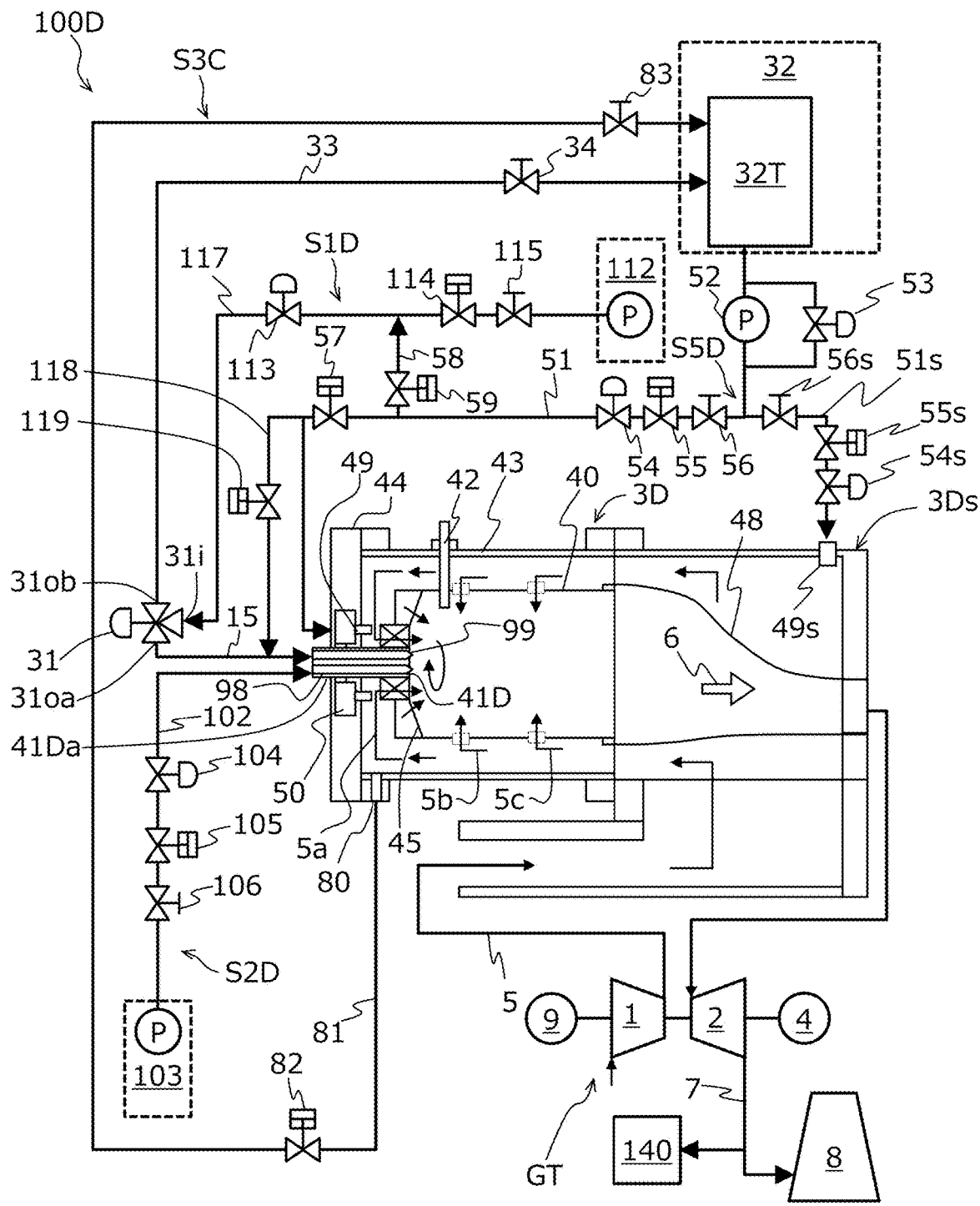
FIG. 11 is a schematic figure depicting a gas turbine facility according to a fourth embodiment of the present invention.

With reference to FIG. 11 to FIG. 15, a gas turbine facility 100D according to a fourth embodiment of the present invention is explained. FIG. 11 is a schematic figure depicting the gas turbine facility 100D according to the fourth embodiment of the present invention. The controller 37 is omitted in FIG. 11. Note that configurations identical or equivalent to configurations explained in the first and third embodiments are given identical reference numerals, and mainly differences are explained.

The main fuel supplied to the combustors 3 is the ammonia gas, and the secondary fuel supplied to the combustors 3 is the natural gas in the examples explained in the first and third embodiments, and the main fuel supplied the combustors 3 is the hydrogen gas, and the secondary fuel supplied to the combustors 3 is the natural gas in the example explained in the second embodiment. In contrast to this, the main fuel supplied to combustors 3D is a liquid ammonia, and the secondary fuel supplied to the combustors 3D is kerosene in an example explained in the fourth embodiment.

The gas turbine facility 100D according to the fourth embodiment includes: a main fuel supply system S1D; a secondary fuel supply system S2D; the fuel treating system S3C; a water supply system S5D; and the three-way valve 31 connected to a main fuel pipe 117 of the main fuel supply system S1D, the main fuel supply pipe 15, and the fuel treating pipe 33 of the fuel treating system S3C. Note that similarly to that in the embodiment described above, the three-way valve 31 is provided at a position close to the combustors 3D as much as possible.

The main fuel supply system S1D is a system that supplies a high-purity liquid ammonia as the main fuel to the combustors 3D. The main fuel supply system S1D has: a main fuel supply facility 112 that supplies the liquid ammonia; the main fuel pipe 117 connected to the main fuel supply facility 112 and the inlet port 31i of the three-way valve 31; and an on-off valve 115, an isolation valve 114, and a flow rate adjustment valve 113 that are provided on the main fuel pipe 117.

The main fuel supply facility 112 includes: a tank (not depicted) that stores the liquid ammonia; and a pump that pumps the liquid ammonia. Note that the liquid ammonia is supplied to the combustors 3D without being vaporized in the present fourth embodiment. Because of this, the vaporizer for the main fuel explained in the first embodiment can be omitted in the present fourth embodiment, and the main fuel supply system S1D can be simplified. The liquid ammonia supplied to the main fuel pipe 117 is supplied to the combustors 3D through the three-way valve 31.

The on-off valve 115, the isolation valve 114, and the flow rate adjustment valve 113 are provided in this order from the upstream side toward the downstream side of the main fuel pipe 117 through which the main fuel is supplied from the main fuel supply facility 112. The on-off valve 115 is a manual valve that can open and close the main fuel pipe 117.

The isolation valve 114 is a control valve that can open and close the main fuel pipe 117 according to a signal from the controller 37. The isolation valve 114 is provided between the main fuel supply facility 112 and the flow rate adjustment valve 113 on the main fuel pipe 117, and has a supply position for supplying the fuel from the main fuel supply facility 112 to the combustors 3D, and an interruption position for interrupting the supply of the fuel from the main fuel supply facility 112 to the combustors 3D.

The flow rate adjustment valve 113 is a control valve that controls the flow rate of the main fuel passing through the flow rate adjustment valve 113, that is, the flow rate of the fuel (liquid ammonia) supplied to the combustors 3D, by adjusting the opening area of the main fuel pipe 117 according to a signal from the controller 37.

The secondary fuel supply system S2D is a system that supplies the kerosene as the secondary fuel to the combustors 3D. The secondary fuel supply system S2D has: a secondary fuel supply facility 103 that supplies the kerosene; a secondary fuel pipe 102 connected to the secondary fuel supply facility 103 and the combustors 3D; and an on-off valve 106, an isolation valve 105, and a flow rate adjustment valve 104 that are provided on the secondary fuel pipe 102.

The secondary fuel supply facility 103 includes: a tank (not depicted) that stores the kerosene as the secondary fuel; and a pump that pumps the kerosene.

The on-off valve 106, the isolation valve 105, and the flow rate adjustment valve 104 are provided in this order from the upstream side toward the downstream side of the secondary fuel pipe 102 through which the secondary fuel is supplied from the secondary fuel supply facility 103. The on-off valve 106 is a manual valve that can open and close the secondary fuel pipe 102. The isolation valve 105 is a control valve that can open and close the secondary fuel pipe 102 according to a signal from the controller 37. The flow rate adjustment valve 104 is a control valve that controls the flow rate of the secondary fuel passing through the flow rate adjustment valve 104 by adjusting the opening area of the secondary fuel pipe 102 according to a signal from the controller 37.

The fuel treating apparatus 32 has configurations similar to that in the first embodiment, and includes: the water tank 32T in which water for diluting the liquid ammonia introduced through the fuel treating pipe 33 is stored; the water supply pump (not depicted) that supplies water to the water tank 32T; and the valve (not depicted) that controls the flow rate of the water supplied from the water supply pump.

As depicted in FIG. 11, the basic configuration of the combustors 3D is similar to that in the third embodiment (see FIG. 8), but the configuration of burners 41D is different. The burners 41D of the combustors 3D according to the present fourth embodiment have liquid fuel nozzles 41Da that can spray a liquid fuel instead of the fuel nozzles 41a explained in the first embodiment.

A spray hole for each type of fuel is formed through each liquid fuel nozzle 41Da. A spray hole 98 that communicates with the secondary fuel pipe 102, and is for spraying the kerosene, and a spray hole 99 that communicates with the main fuel supply pipe 15, and is for spraying the liquid ammonia are formed through the liquid fuel nozzle 41Da according to the present embodiment.

To the combustors 3D, similarly to the first embodiment, the spray nozzles 49 for spraying the ammonia water to combustion sites are provided for the purpose of reducing the discharge amount of nitrogen oxides (NOx) in the exhaust gas 7. In addition, similarly to the first embodiment, a casing 3Ds is provided with the spray nozzles 49s for the purpose of increasing the output power of the gas turbine GT. The ammonia water is supplied from the water tank 32T to the spray nozzles 49 and 49s.

Similarly to the first embodiment, the water supply system S5D has: the water supply pipe 51 connected to the water tank 32T of the fuel treating apparatus 32 and the combustors 3D; the water pump 52, the pressure adjustment valve 53, the on-off valve 56, the isolation valve 55, and the flow rate adjustment valve 54 that are provided on the water supply pipe 51; and the spray nozzles 49. In addition, the water supply system S5D has: the water supply pipe 51s that branches off from the water supply pipe 51 downstream of the water pump 52; the on-off valve 56s, the isolation valve 55s, and the flow rate adjustment valve 54s that are provided on the water supply pipe 51s; and the spray nozzles 49s.

In the present fourth embodiment, an isolation valve 57 is provided downstream of the flow rate adjustment valve 54 on the water supply pipe 51. Similarly to the isolation valve 55, the isolation valve 57 is a control valve that can open and close the water supply pipe 51 according to a signal from the controller 37.

A first branch pipe 118 that branches off from the water supply pipe 51 is provided downstream of the isolation valve 57 on the water supply pipe 51. The first branch pipe 118 is connected to the main fuel supply pipe 15. The first branch pipe 118 is provided with an isolation valve 119. The isolation valve 119 is a control valve that can open and close the first branch pipe 118 according to a signal from the controller 37.

A second branch pipe 58 that branches off from the water supply pipe 51 is provided between the flow rate adjustment valve 54 and the isolation valve 57 on the water supply pipe 51. The second branch pipe 58 is connected between the isolation valve 114 and the flow rate adjustment valve 113 on the main fuel pipe 117. The second branch pipe 58 is provided with an isolation valve 59. The isolation valve 59 is a control valve that can open and close the second branch pipe 58 according to a signal from the controller 37.

Similarly to the third embodiment, each combustor 3D is provided with the drain hole 80. Similarly to the third embodiment, the drain hole 80 is connected to the drain pipe 81 of the fuel treating system S3C.

The combustors 3D can stably combust the main fuel and the secondary fuel. The controller 37 controls each control valve according to a set operation mode. The operation modes include: a kerosene mono-fuel combustion mode in which only the kerosene is combusted by the combustors 3D; a mixed combustion mode in which the liquid ammonia and the kerosene are combusted simultaneously by the combustors 3D; and a liquid ammonia mono-fuel combustion mode in which only the liquid ammonia is combusted by the combustors 3D.

An exhaust pipe connecting the turbine 2 and the chimney 8 to each other is provided with an ammonia concentration sensor 140. The ammonia concentration sensor 140 senses the concentration of ammonia in the exhaust gas 7 in the gas turbine GT, and outputs a signal representing a sensing result to the controller 37. The controller 37 switches to an operation mode in which the ammonia concentration is lowered or, in some cases, determines that the emergency stop condition is satisfied, in a case where an ammonia concentration abnormality is sensed. If the ammonia concentration sensed by the ammonia concentration sensor 140 becomes higher than a concentration threshold, the controller 37 determines that an ammonia concentration abnormality is sensed.

The controller 37 switches to an operation mode in which the ammonia concentration is lowered or, in some cases, emergently stops the gas turbine GT when the ammonia concentration of the exhaust gas 7 is higher than the concentration threshold. Thereby, the amount of ammonia released from the chimney 8 to the atmosphere can be reduced.

Figure 12:
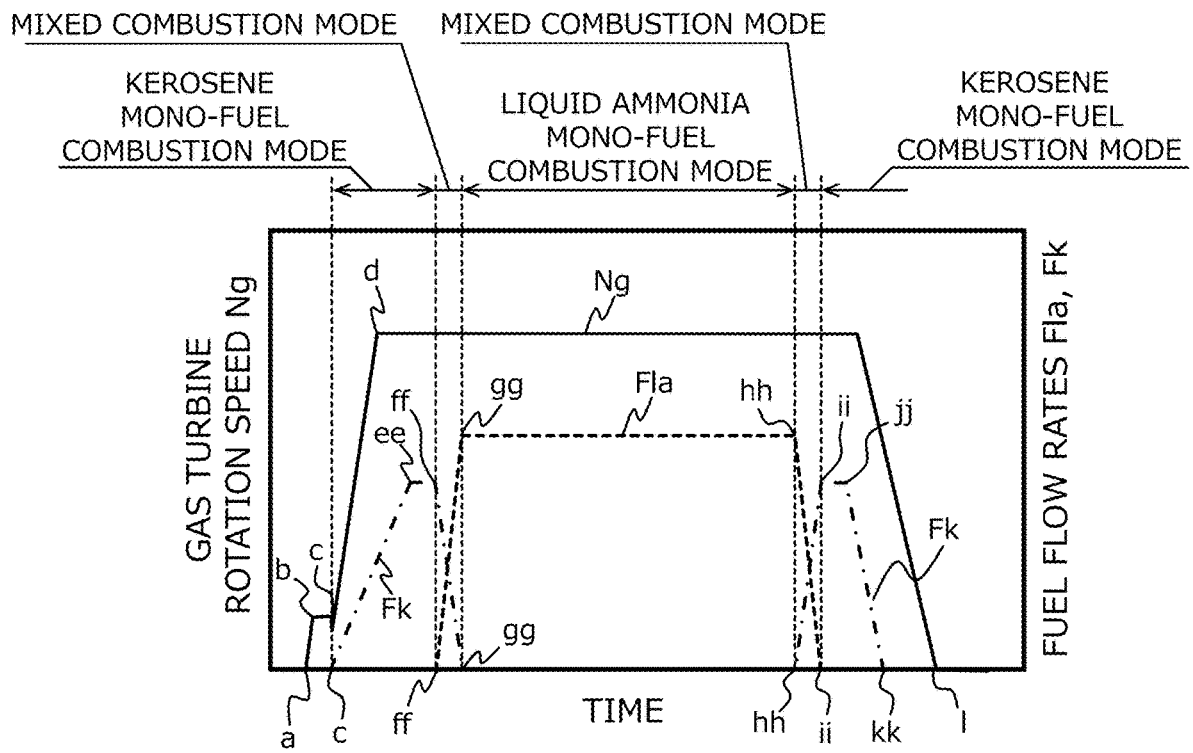
FIG. 12 is a figure depicting an example of temporal changes in the rotation speed of the gas turbine according to the fourth embodiment of the present invention and fuel flow rates in normal operation of the gas turbine.
Figure 13:
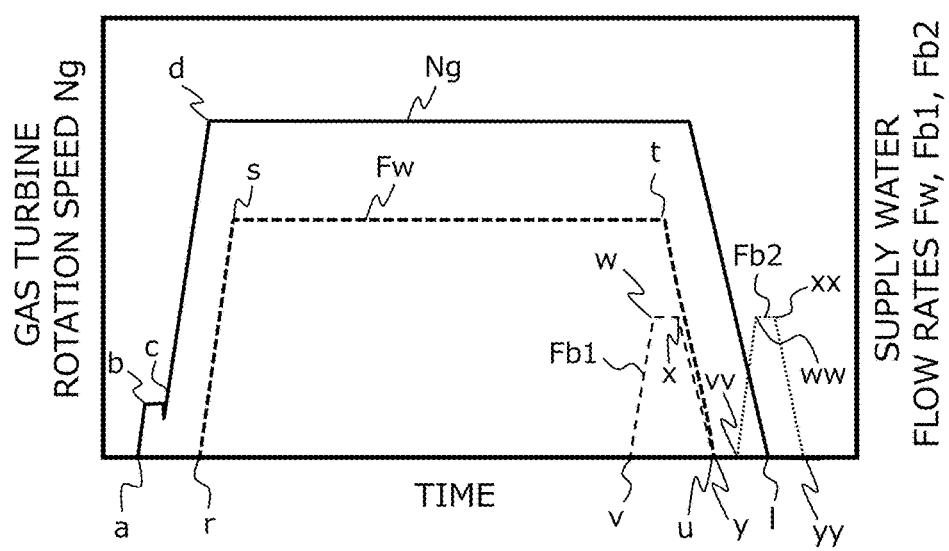
FIG. 13 is a figure depicting an example of temporal changes in the rotation speed of the gas turbine according to the fourth embodiment of the present invention and supply water flow rates in normal operation of the gas turbine.

With reference to FIG. 12 and FIG. 13, an example of a method of operating the gas turbine GT according to the present embodiment is explained. FIG. 12 is a figure depicting an example of temporal changes in the rotation speed Ng of the gas turbine GT according to the fourth embodiment of the present invention and fuel flow rates in normal operation of the gas turbine GT. Note that the fuel flow rates include a kerosene fuel flow rate Fk which is the flow rate of the kerosene supplied to the combustors 3D, and a liquid ammonia fuel flow rate Fla which is the flow rate of the liquid ammonia supplied to the combustors 3D.

Liquid ammonia is difficult to be ignited as compared with kerosene. Because of this, the gas turbine facility 100D according to the present fourth embodiment activates the gas turbine GT by using the kerosene, which is highly reliable in terms of ignition and activation, and thereafter switches the fuels from the kerosene to the liquid ammonia.

As depicted in FIG. 12, the gas turbine GT is activated by the activation motor 9 (see FIG. 11) at point a. At point b where the rotation speed of the gas turbine GT becomes a predetermined rotation speed, purge operation for a fuel that is likely to be remaining is implemented for a certain length of time. Then, at point c, the kerosene is supplied to the combustors 3D, and ignited by the spark plugs 42.

Due to the ignition in the combustors 3D, the rotation speed Ng of the gas turbine GT increases from point c until point d, and reaches a rated rotation speed at point d. The activation motor 9 is disconnected from the rotation shaft (rotor) of the turbine 2 during the increase in the rotation speed from point c until point d. Accordingly, at point d at which the rated rotation speed is reached, the energy of the combustion gas 6 generated in the combustors 3D singly rotates the turbine 2.

The controller 37 increases the kerosene fuel flow rate Fk until point ee such that a predetermined load is generated after the rotation speed Ng of the gas turbine GT has reached the rated rotation speed. Thereafter, the controller 37 operates the gas turbine facility 100D in the kerosene mono-fuel combustion mode until point ff.

After point ff is reached, the controller 37 gradually reduces the kerosene fuel flow rate Fk, and also gradually increases the liquid ammonia fuel flow rate Fla. From point ff until point gg, the controller 37 operates the gas turbine facility 100D in the mixed combustion mode in which both the kerosene and the liquid ammonia are supplied to the combustors 3D, and combusted.

At point gg, the controller 37 makes the kerosene fuel flow rate Fk 0 (zero), and operates the gas turbine facility 100D in the liquid ammonia mono-fuel combustion mode from point gg. In the liquid ammonia mono-fuel combustion mode, only the liquid ammonia is combusted in the combustors 3D, thus the amount of carbon dioxide contained in the exhaust gas 7 can be reduced as compared to a time of the kerosene mono-fuel combustion mode.

After point hh is reached, the controller 37 gradually reduces the liquid ammonia fuel flow rate Fla, and also gradually increases the kerosene fuel flow rate Fk. From point hh until point ii, the controller 37 operates the gas turbine facility 100D in the mixed combustion mode in which both the kerosene and the liquid ammonia are supplied to the combustors 3D, and combusted.

At point ii, the controller 37 makes the liquid ammonia fuel flow rate Fla 0 (zero), and, from point ii, operates the gas turbine facility 100D in the kerosene mono-fuel combustion mode in which only the kerosene is supplied to the combustors 3D, and combusted.

The controller 37 reduces the kerosene fuel flow rate Fk from point jj, and makes it 0 (zero) at point kk. Thereby, at subsequent point 1, the gas turbine GT is stopped.

Next, with reference to FIG. 13, a process of spraying water to the combustors 3D, and a water replacement process that are performed by the water supply system S5D are explained. FIG. 13 is a figure depicting an example of temporal changes in the rotation speed Ng of the gas turbine GT according to the fourth embodiment of the present invention and supply water flow rates in normal operation of the gas turbine GT. Note that the supply water flow rates include: a spray water flow rate Fw that is the flow rate of the ammonia water sprayed from the spray nozzles 49 and the spray nozzles 49s; a first branch water flow rate Fb1 that is the flow rate of the ammonia water supplied from the first branch pipe 118 to the main fuel supply pipe 15; and a second branch water flow rate Fb2 that is the flow rate of the ammonia water supplied from the second branch pipe 58 to the main fuel pipe 117.

The ammonia water supplied from the first branch pipe 118 to the main fuel supply pipe 15 is mixed with the liquid ammonia remaining in the main fuel supply pipe 15, and sprayed from the liquid fuel nozzles 41Da.

As depicted in FIG. 13, for example, at point r which is located between a point at which the supply of the kerosene to the combustors 3D is started and a point at which the kerosene fuel flow rate Fk reaches the maximum value, the controller 37 starts spraying of the ammonia water from the spray nozzles 49 and the spray nozzles 49s. The spray water flow rate Fw starts increasing at point r, and becomes a controlled value at point s. The spray water flow rate Fw starts decreasing at point t, and becomes 0 (zero) at point u. The spray water flow rate Fw is preferably controlled according to NOx-discharge characteristics or the like.

Note that characteristics of the spray water flow rate Fw are not limited to the example depicted in FIG. 13, but, for example, may be changed according to liquid ammonia fuel flow rate characteristics. That is, the spray water flow rate Fw may have characteristics of starting increasing at point ff, becoming the maximum value at point gg, starting decreasing at point hh, and becoming 0 (zero) at point ii.

Here, a method of spraying the ammonia water from the spray nozzles 49 and 49s is explained. The spray water flow rate Fw represents the total amount of the ammonia water sprayed from the spray nozzles 49 installed in the end covers 44 of the combustors 3 and the spray nozzles 49s installed in the casings 3s. Spraying of the ammonia water from the spray nozzles 49 is preferably performed in the kerosene mono-fuel combustion mode. In the kerosene mono-fuel combustion mode, the combustion temperature locally increases inside the inner cylinders (liners) 40, and the discharge amount of nitrogen oxides increases. By spraying the ammonia water to combustion sites from the spray nozzles 49, a decrease in the combustion temperature, and a reduction of generation of nitrogen oxides can be expected.

On the other hand, the spray nozzles 49s installed in the casings 3s spray the ammonia water at a time of liquid ammonia mono-fuel combustion, and thereby an increase in a working fluid for the turbine 2, and an increase in the output power of the gas turbine GT can be expected.

In this manner, in the present fourth embodiment, similarly to the first embodiment, the energy can be used effectively by spraying the ammonia water in the water tank 32T into the combustors 3D. In addition, the amount of the ammonia water to be disposed of can be reduced, thus disposal costs can be reduced.

The controller 37 controls, between point hh (see FIG. 12) and point ii, the isolation valve 114 of the main fuel pipe 117 such that it is switched from the supply position to the interruption position, and also switches the three-way valve 31 from the first position to the second position. At point ii, the isolation valve 114 completes switching to the interruption position. Thereby, the amount of the liquid ammonia sprayed to the combustors 3D can be minimized, and it becomes possible to lower the concentration of ammonia in the exhaust gas 7 released from the chimney 8.

Furthermore, in the present fourth embodiment, at point v which is the same timing as point hh at which the liquid ammonia fuel flow rate Fla starts decreasing, the controller 37 switches the isolation valve 119 provided on the first branch pipe 118 from the interruption position to the supply position. Thereby, the liquid ammonia remaining in the main fuel supply pipe 15 and the ammonia water supplied through the first branch pipe 118 are supplied to the liquid fuel nozzles 41Da.

Before the isolation valve 114 of the main fuel pipe 117 is switched to the interruption position, the ammonia water is supplied from the first branch pipe 118 to the three-way valve 31 and the main fuel supply pipe 15. If the isolation valve 114 is switched to the interruption position, there is no longer the supply of the liquid ammonia to the main fuel supply pipe 15. Thereby, the inside of the main fuel supply pipe 15 is washed away by the ammonia water supplied from the first branch pipe 118.

Note that the first branch water flow rate Fb1 increases from point v until point w, becomes a predetermined flow rate from point w until point x, and decreases from point x until point y. From point w until point x, the ammonia water is sprayed into the combustors 3D from the liquid fuel nozzles 41Da at the predetermined flow rate, but the combustors 3D is performing combustion stably by using the kerosene. Because of this, the combustors 3D can perform combustion stably even if the mixture water containing the liquid ammonia and the ammonia water from the first branch pipe 118 is injected to the combustors 3D. As a result, it becomes possible to further lower the concentration of ammonia in the exhaust gas 7 released from the chimney 8 to the atmosphere.

Note that whereas the timing (point x) at which the first branch water flow rate Fb1 starts decreasing and the timing (point t) at which the spray water flow rate Fw starts decreasing are the same timing in the example depicted in FIG. 13, the timing (point x) at which the first branch water flow rate Fb1 starts decreasing and the timing (point y) at which the first branch water flow rate Fb1 becomes 0 (zero) can be set to any timings.

In the present embodiment, the isolation valve 114 is switched from the supply position to the interruption position, and also the three-way valve 31 is switched from the first position to the second position. Accordingly, the liquid ammonia located downstream of the isolation valve 114 and remaining in the main fuel pipe 117 is introduced to the fuel treating apparatus 32 through the three-way valve 31 and the fuel treating pipe 33.

Note that after the liquid ammonia is recovered in the fuel treating apparatus 32, there is the liquid ammonia adhered to the inside of the fuel treating pipe 33 through which the liquid ammonia has passed. In view of this, as depicted in FIG. 11, in the gas turbine facility 100D according to the present fourth embodiment, the second branch pipe 58 that branches off from the water supply pipe 51 is connected to the downstream of the isolation valve 114 on the main fuel pipe 117.

The controller 37 switches, at a time at which presumably the liquid ammonia completely flows to the fuel treating apparatus 32, that is, at point vv in FIG. 13, the isolation valve 59 from the interruption position to the supply position. The second branch water flow rate Fb2 increases from point vv until point ww, and the ammonia water is supplied to the main fuel pipe 117 at a predetermined flow rate from point ww until point xx. The second branch water flow rate Fb2 starts decreasing from point xx, and becomes 0 (zero) at point yy. The ammonia water having been supplied to the main fuel pipe 117 is supplied to the fuel treating pipe 33 through the three-way valve 31, and is recovered in the fuel treating apparatus 32. Thereby, the high-purity liquid ammonia adhering to the insides of the main fuel pipe 117 and the fuel treating pipe 33 is washed away by the ammonia water.

Figure 14:
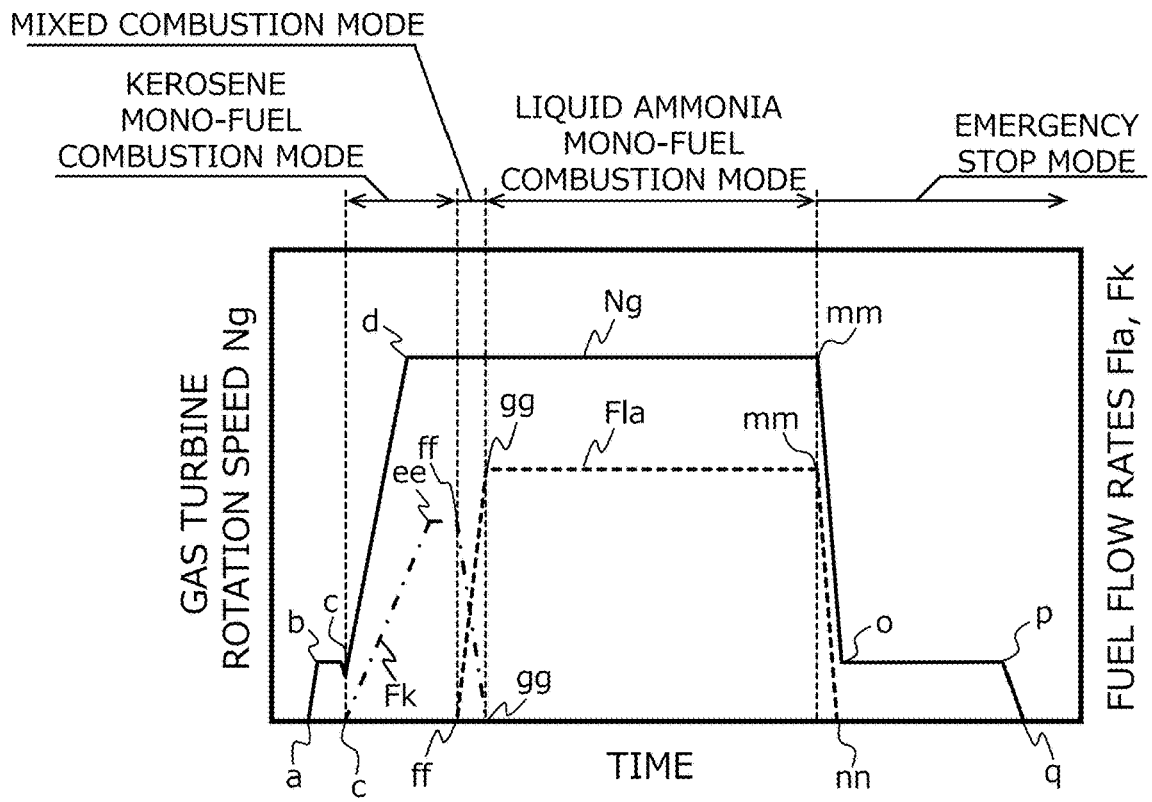
FIG. 14 is a figure depicting an example of temporal changes in the rotation speed of the gas turbine according to the fourth embodiment of the present invention and the fuel flow rates when the gas turbine is stopped emergently.
Figure 15:
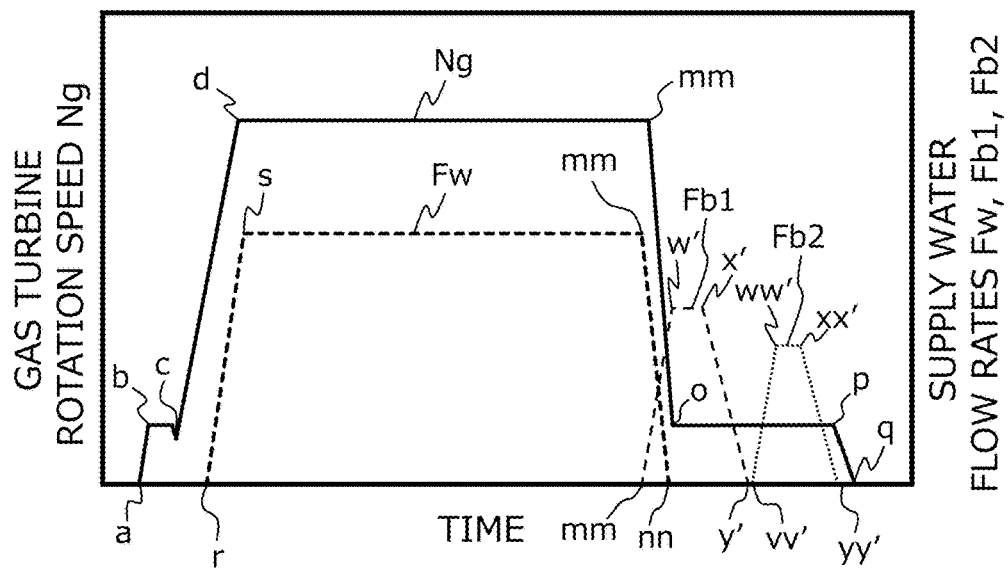
FIG. 15 is a figure depicting an example of temporal changes in the rotation speed of the gas turbine according to the fourth embodiment of the present invention and the supply water flow rates when the gas turbine is stopped emergently.

With reference to FIG. 14 to FIG. 15, an example of a method of emergently stopping the gas turbine GT according to the fourth embodiment of the present invention is explained. FIG. 14 is a figure depicting an example of temporal changes in the rotation speed Ng of the gas turbine GT according to the fourth embodiment of the present invention and the fuel flow rates when the gas turbine GT is stopped emergently. FIG. 15 is a figure depicting an example of temporal changes in the rotation speed Ng of the gas turbine GT according to the fourth embodiment of the present invention and the supply water flow rates when the gas turbine GT is stopped emergently.

Temporal changes until point gg in FIG. 14 are the same as those in FIG. 12. As depicted in FIG. 14, the gas turbine facility 100D is operated in the liquid ammonia mono-fuel combustion mode from point gg. FIG. 14 depicts a situation in which, at point mm, the gas turbine GT is stopped emergently due to sensing of some abnormality.

As depicted in FIG. 14, the controller 37 proceeds, when the emergency stop condition is satisfied, to the emergency stop mode, and causes the isolation valve 114 to start interruption of the supply of the liquid ammonia to the combustors 3D (point mm). At point nn, the liquid ammonia fuel flow rate Fla becomes 0 (zero) due to interruption by the isolation valve 114. In addition, the controller 37 switches the isolation valve 114 from the supply position to the interruption position, and also switches the three-way valve 31 from the first position to the second position.

Note that similarly to the third embodiment, the controller 37 according to the present fourth embodiment drives the activation motor 9, and rotates the gas turbine GT at a predetermined rotation speed for a certain length of time in the emergency stop mode (point o to point p).

Temporal changes until point s in FIG. 15 are the same as those in FIG. 13. As depicted in FIG. 15, the controller 37 according to the present fourth embodiment switches the isolation valve 119 from the interruption position to the supply position in conjunction with switching of the isolation valve 114 from the supply position to the interruption position (point mm). In addition, the controller 37 switches the isolation valve 119 back to the interruption position after keeping the isolation valve 119 at the supply position for a certain length of time. Thereby, the first branch water flow rate Fb1 increases from point mm until point w', becomes a constant value from point w' until point x', and decreases from point x' until point y'. Thereby, it is possible to wash away the high-purity liquid ammonia remaining in the main fuel supply pipe 15 depicted in FIG. 11 with the ammonia water, and spray the ammonia water in which the liquid ammonia is dissolved into the inner cylinders 40 from the spray holes 99.

The ammonia water supplied from the main fuel supply pipe 15 into the inner cylinders 40 through the spray holes 99 flows from openings of the inner cylinders 40 into circular flow paths between the outer cylinders 43 and the inner cylinders 40, and thereafter flows from the drain holes 80 to the drain pipe 81. The ammonia water having flowed to the drain pipe 81 is introduced to the water tank 32T of the fuel treating apparatus 32. Thereby, the amount of ammonia released from the chimney 8 to the atmosphere can be reduced.

The controller 37 switches the isolation valve 59 from the interruption position to the supply position at a time at which presumably the liquid ammonia that is in the main fuel pipe 117 and between the isolation valve 114 and the three-way valve 31 completely flows to the fuel treating apparatus 32 through the fuel treating pipe 33, that is, at point vv' in FIG. 15. In addition, the controller 37 switches the isolation valve 59 back to the interruption position after keeping the isolation valve 59 at the supply position for a certain length of time. Thereby, the second branch water flow rate Fb2 increases from point vv' until point ww', and the ammonia water is supplied to the main fuel pipe 117 at a predetermined flow rate from point ww' until point xx'. The second branch water flow rate Fb2 starts decreasing from point xx', and becomes 0 (zero) at point yy'. The ammonia water having been supplied to the main fuel pipe 117 is supplied to the fuel treating pipe 33 through the three-way valve 31, and is recovered in the fuel treating apparatus 32. Thereby, the high-purity liquid ammonia adhering to the insides of the main fuel pipe 117 and the fuel treating pipe 33 is washed away by the ammonia water.

As mentioned above, the fuel supplied from the main fuel supply facility 112 to the combustors 3D through the three-way valve 31 is the liquid ammonia in the example explained in the present fourth embodiment. In such a fourth embodiment also, similarly to the embodiments described above, the three-way valve 31 arranged near the combustors 3D is switched from the first position to the second position in conjunction with switching of the isolation valve 114 from the supply position to the interruption position. Thereby, it is possible to keep small the amount of release of the ammonia gas generated by vaporization of the liquid ammonia to the atmosphere at a time of an emergency stop of the gas turbine GT.

Modification examples like the ones mentioned below also lie within the scope of the present invention.

First Modification Example

Whereas the natural gas is used as the secondary fuel in the examples explained in the first to third embodiments, a gas fuel other than the natural gas may be used as the secondary fuel. In addition, whereas the kerosene is used as the secondary fuel in the example explained in the fourth embodiment, a liquid fuel other than the kerosene may be used as the secondary fuel or a gas fuel may be used as the secondary fuel. Furthermore, whereas the gas turbine facility includes the dual-system fuel supply system including the main fuel supply system and the secondary fuel supply system in the examples explained in the first to fourth embodiments, the present invention is not limited to this. The gas turbine facility may include a fuel supply system including three systems or more.

Second Modification Example

Whereas the multi-can gas turbine GT including a plurality of combustors is explained in the embodiments described above, the present invention is not limited to this. The present invention can also be applied to a single-can gas turbine GT including a single combustor.

Third Modification Example

Whereas the three-way valve 31 is provided upstream of the manifold connected to the plurality of combustors in the examples explained in the embodiments described above, the present invention is not limited to this. Three-way valves 31 may be provided on pipes connecting the manifold and the combustors 3 to each other. Note that, as explained in the embodiments described above, by providing the three-way valve 31 upstream of the manifold, the number of three-way valves 31 can be reduced as compared to a case where three-way valves 31 are provided downstream of the manifold. In order to reduce the amount of release of the ammonia gas to the atmosphere, it is desirable to make the position of the three-way valve 31 on the main fuel supply pipe 15 relatively close to the manifold. On the other hand, where the three-way valves 31 are installed on pipes located downstream of the manifold, it is possible to reduce release of a fuel remaining in the manifold to the atmosphere. The ammonia gas remaining in the main fuel pipe 17 can be introduced to the fuel treating apparatus 32 in any of the examples, thus release of the ammonia gas to the atmosphere can be reduced effectively.

Figure 16:
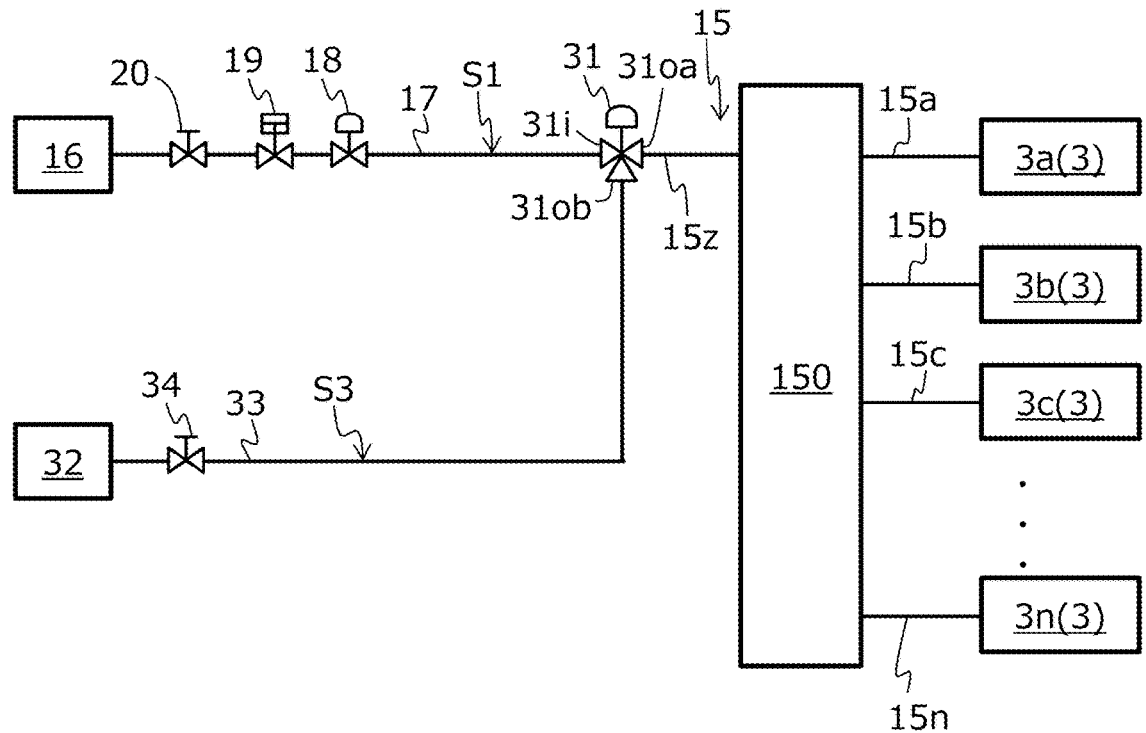
FIG. 16 is a figure related to a modification example of the present invention, and depicting an example in which a three-way valve is provided upstream of a manifold.
Figure 17:
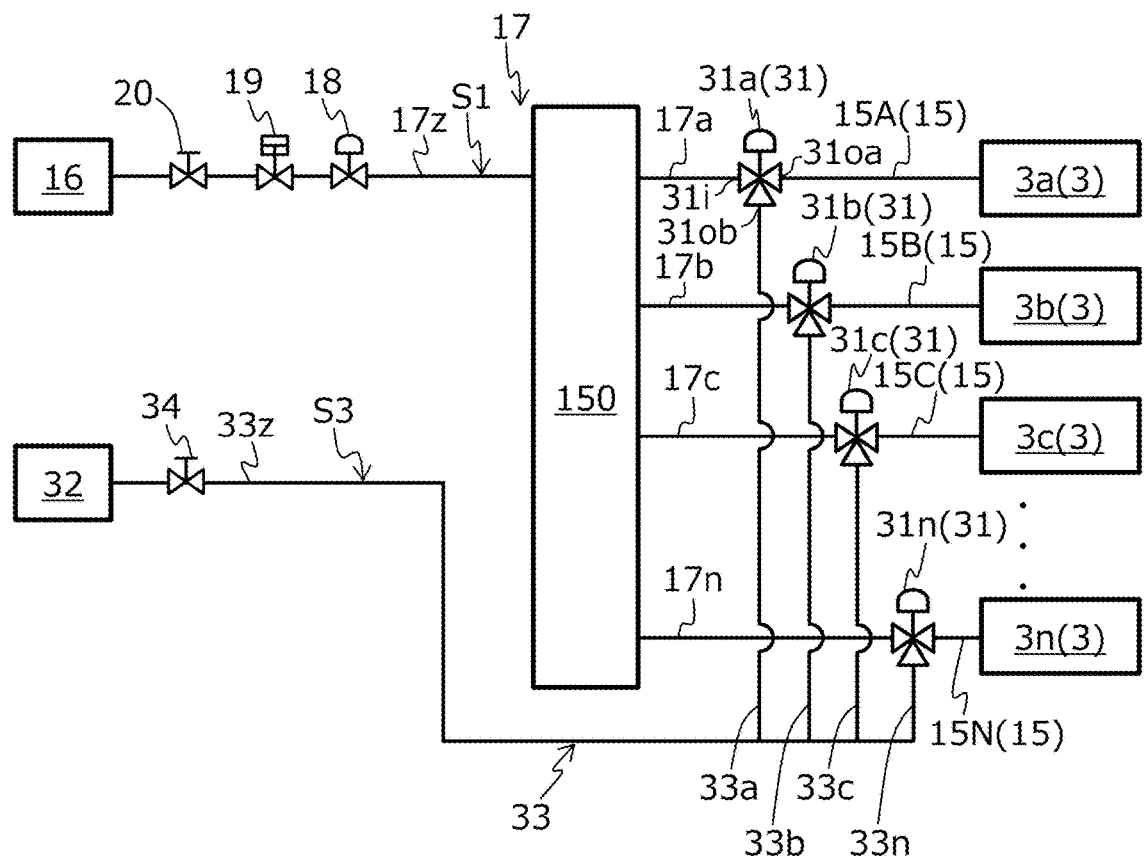
FIG. 17 is a figure related to a modification example of the present invention, and depicting an example in which three-way valves are provided downstream of the manifold.

Here, FIG. 16 depicts an example in which a three-way valve 31 is arranged upstream of the manifold 150, and FIG. 17 depicts an example in which three-way valves 31 are arranged downstream of the manifold 150. The gas turbine facility includes a plurality of combustors 3 (3a, 3b, 3c, . . . and 3n), and the fuel is supplied to the combustors 3a to 3n in a branched manner via the manifold 150.

In the example in FIG. 16, a three-way valve 31 is arranged at one location on the upstream side of the manifold 150. In this example, the main fuel supply pipe 15 includes an introducing pipe 15z, the manifold 150, and a plurality of branch pipes 15a, 15b, 15c, . . . and 15n. The introducing pipe 15z is connected to the manifold 150 and the first outlet port 31oa of the three-way valve 31, and introduces, to the manifold 150, a fuel supplied from the main fuel pipe 17 through the three-way valve 31. The manifold 150 causes the fuel introduced through the introducing pipe 15z to be supplied to the plurality of branch pipes 15a, 15b, 15c, . . . and 15n in a branched manner. The plurality of branch pipes 15a, 15b, 15c, . . . and 15n are connected to the manifold 150 and the plurality of combustors 3 (3a, 3b, 3c, . . . and 3n), and supply, to the plurality of combustors 3 (3a, 3b, 3c, . . . and 3n), the fuel supplied from the manifold 150. According to this configuration, as compared to a case where a three-way valve is installed on each of branch pipes branching off from the manifold 150, the number of three-way valves, and the number of pipes that supply an uncombusted fuel to the fuel treating apparatus 32 can be reduced.

In the example in FIG. 17, three-way valves 31 (31a, 31b, 31c, . . . and 31n) are arranged on branch pipes 17a, 17b, 17c, . . . and 17n, respectively, that are located downstream of the manifold 150. In this example, the main fuel pipe 17 includes an introducing pipe 17z, the manifold 150, and the plurality of the branch pipes 17a, 17b, 17c, . . . and 17n. In addition, the fuel treating pipe 33 includes a plurality of small-diameter pipes 33a, 33b, 33c, . . . and 33n, and a large-diameter pipe 33z having an internal diameter larger than the internal diameter of the small-diameter pipes.

The introducing pipe 17z is connected to the main fuel supply facility 16 and the manifold 150, and introduces, to the manifold 150, a fuel supplied from the main fuel supply facility 16. The manifold 150 causes the fuel introduced through the introducing pipe 17z to be supplied to the plurality of branch pipes 17a, 17b, 17c, . . . and 17n in a branched manner. The plurality of branch pipes 17a, 17b, 17c, . . . and 17n are connected to the manifold 150 and the inlet ports 31i of the plurality of three-way valves 31 (31a, 31b, 31c, . . . and 31n). The first outlet ports 31oa of the plurality of three-way valves 31 (31a, 31b, 31c, . . . and 31n) are connected with a plurality of main fuel supply pipes 15 (15A, 15B, 15C, . . . and 15N), respectively. The second outlet ports 31ob of the plurality of three-way valves 31 (31a, 31b, 31c, . . . and 31n) are connected with the plurality of small-diameter pipes 33a, 33b, 33c, . . . and 33n, respectively, included in the fuel treating pipe 33. The plurality of main fuel supply pipes 15 (15A, 15B, 15C, . . . and 15N) are connected to the plurality of combustors 3 (3a, 3b, 3c, . . . and 3n). The plurality of small-diameter pipes 33a, 33b, 33c, . . . and 33n are connected to the large-diameter pipe 33z included in the fuel treating pipe 33. The large-diameter pipe 33z is connected to the fuel treating apparatus 32. According to this configuration, by switching the plurality of three-way valves 31 (31a, 31b, 31c, . . . and 31n) from the first positions to the second positions, it becomes possible to introduce, to the fuel treating apparatus 32, a remaining fuel in the main fuel pipe 17 including a remaining fuel in the manifold 150 having a predetermined capacity, and the amount of release of the ammonia gas to the atmosphere can be reduced more.

The embodiments and modification examples mentioned above are illustrated as examples for explaining the present invention in an easy-to-understand manner, and the present invention is not necessarily limited to one including all configurations explained. In addition, it is possible to replace some of the configurations of an embodiment or a modification example with configurations of another embodiment or modification example. In addition, it is also possible to add configurations of an embodiment or modification example to the configurations of another embodiment or modification example.

For example, whereas the ammonia gas is the main fuel in the example explained in the third embodiment, a hydrogen gas may be used as the main fuel instead of the ammonia gas in the third embodiment. After the emergency stop condition is satisfied, the activation motor 9 rotates the gas turbine GT for a certain length of time, thus the concentration of the hydrogen gas in the gas turbine GT can be lowered. As a result, as compared with the second embodiment, ignition of the hydrogen gas at unintended locations can be prevented more effectively.

In addition, examples of various abnormalities occurrences of which satisfy the emergency stop condition are explained in the second modification example of the first embodiment. The process of determining whether or not the emergency stop condition is satisfied on the basis of the various abnormalities described in the second modification example of the first embodiment can similarly be performed in the second to fourth embodiments also.

As mentioned above, as explained in the embodiments and modification examples described above, the gas turbine facility includes the three-way valve that connects: the fuel pipe connected to the fuel supply facility; the fuel supply pipe connected to the combustors; and the fuel treating pipe connected to the fuel treating apparatus, to each other. According to this configuration, when the gas turbine GT is to be stopped emergently, by operating the three-way valve along with the isolation valve of the fuel supply pipe, and also causing the three-way valve to establish communication between the fuel pipe and the fuel treating pipe, an uncombusted fuel (the ammonia gas, the hydrogen gas, the liquid ammonia, etc.) remaining in the fuel supply pipe can be supplied to the fuel treating apparatus. According to such a gas turbine facility, a malfunction resulting from the uncombusted fuel can be prevented at a time of an emergency stop of the gas turbine.

DESCRIPTION OF REFERENCE CHARACTERS

1: Compressor
2: Turbine
2N: Rotation speed sensor
3, 3D: Combustor
3s, 3Ds: Casing
4: Generator
5: Compressed air
5a: Combustion air
5b: Secondary combustion air
5c: Diluted air
6: Combustion gas
8: Chimney
9: Activation motor
11, 102: Secondary fuel pipe
12, 18, 24, 54, 73, 104, 113: Flow rate adjustment valve
13, 19, 25, 57, 59, 74, 82, 105, 114, 119: Isolation valve
14, 20, 26, 29, 30, 34, 36, 56, 75, 78, 83, 106, 115: On-off valve
15: Main fuel supply pipe (fuel supply pipe)
16, 71: Main fuel supply facility (fuel supply facility)
17, 72, 117: Main fuel pipe (fuel pipe)
17Pa: Inlet pressure sensor
17Pb: Outlet pressure sensor
17T: Fuel temperature sensor
23: Nitrogen gas pipe
31: Three-way valve
31i: Inlet port
31oa: First outlet port
31ob: Second outlet port
32, 77: Fuel treating apparatus
32T: Water tank
33, 76: Fuel treating pipe
37: Controller
38: Input apparatus
40: Inner cylinder
41, 41D: Burner
41a: Fuel nozzle
41b: Swirler
41Da: Liquid fuel nozzle
42: Spark plug
43: Outer cylinder
44: End cover
45: Inner cylinder cap
46: Injection hole
47: Injection hole
48: Transition piece
49, 49s: Spray nozzle
50: Water manifold
51, 51s: Water supply pipe
52: Water pump
53: Pressure adjustment valve
55, 55s: Isolation valve (water isolation valve)
58: Second branch pipe
80: Drain hole
81: Drain pipe
98, 99: Spray hole
101: Enclosure
118: First branch pipe
140: Ammonia concentration sensor
150: Manifold
Fag: Ammonia gas fuel flow rate
Fb1: First branch water flow rate
Fb2: Second branch water flow rate
Fk: Kerosene fuel flow rate
Fla: Liquid ammonia fuel flow rate
Fng: Natural gas fuel flow rate
Fw: Spray water flow rate
GT: Gas turbine
S1, S1B, S1D: Main fuel supply system
S2, S2D: Secondary fuel supply system
S3, S3B, S3C: Fuel treating system
S4: Nitrogen gas supply system
S5, S5D: Water supply system

What is claimed is:

1. A power generation facility, comprising:
an ammonia supply pipe that supplies ammonia gas or liquid ammonia as a fuel from a fuel supply facility to a device that combusts and eliminates an ammonia water for power generation;
a fuel treating pipe that connects the ammonia supply pipe and a fuel treating apparatus, wherein the fuel treating apparatus includes a water tank storing water used to treat the ammonia gas or liquid ammonia introduced through the fuel treating pipe; and
a water supply system including a water supply pipe that supplies the ammonia water from the water tank of the fuel treating apparatus to the device that combusts and eliminates the ammonia water, and a spray nozzle that sprays the ammonia water supplied from the water supply pipe into the device that combusts and eliminates the ammonia water.

2. The power generation facility according to claim 1, wherein the device that combusts and eliminates the ammonia water is a combustor of a gas turbine.

3. The power generation facility according to claim 1, wherein
the ammonia supply pipe includes a fuel pipe connected to the fuel supply facility, and a fuel supply pipe connected to the device that combusts the fuel,
the power generation facility further comprises a three-way valve including an inlet port connected to the fuel pipe, a first outlet port connected to the fuel supply pipe, and a second outlet port connected to the fuel treating pipe.

4. The power generation facility according to claim 1, further comprising:
- a main fuel supply system including a main fuel supply facility that is the fuel supply facility that supplies the ammonia gas as the fuel;
- a secondary fuel supply system including a secondary fuel supply facility that supplies natural gas as a fuel; and
- a controller configured to perform a power generation operation in a plurality of operation modes,
- the plurality of operation modes include:
  - an ammonia gas mono-fuel combustion mode in which the fuel from the main fuel supply system is combusted in the device that combusts and eliminates the ammonia water;
  - a natural gas mono-fuel combustion mode in which the fuel from the secondary fuel supply system is combusted in the device that combusts and eliminates the ammonia water; and
  - a mixed combustion mode in which the fuels from both the main fuel supply system and the secondary fuel supply system are combusted in the device that combusts and eliminates the ammonia water,
- the water supply system includes a water isolation valve that is provided in the water supply pipe and controlled by the controller, and
- the controller is configured to supply the ammonia water in the water tank to the spray nozzle through the water isolation valve during operation in the natural gas mono-fuel combustion mode.

5. The power generation facility according to claim 4, further comprising:
- a nitrogen gas supply system that supplies a nitrogen gas to the main fuel supply system and the secondary fuel supply system.

6. The power generation facility according to claim 1, further comprising:
- a main fuel supply system including a main fuel supply facility that is the fuel supply facility that supplies the liquid ammonia as the fuel;
- a secondary fuel supply system including a secondary fuel supply facility that supplies kerosene as a fuel; and
- a controller configured to perform a power generation operation in a plurality of operation modes,
- the plurality of operation modes include:
  - a liquid ammonia mono-fuel combustion mode in which the fuel from the main fuel supply system is combusted in the device that combusts and eliminates the ammonia water;
  - a kerosene mono-fuel combustion mode in which the fuel from the secondary fuel supply system is combusted in the device that combusts and eliminates the ammonia water; and
  - a mixed combustion mode in which the fuels from both the main fuel supply system and the secondary fuel supply system are combusted in the device that combusts and eliminates the ammonia water,
- the water supply system includes a water isolation valve that is provided in the water supply pipe and controlled by the controller, and
- the controller is configured to supply the ammonia water in the water tank to the spray nozzle through the water isolation valve during operation in the kerosene mono-fuel combustion mode.

7. The power generation facility according to claim 1, further comprising:
- a main fuel supply system including a main fuel supply facility that is the fuel supply system that supplies the liquid ammonia as the fuel; and
- a secondary fuel supply system including a secondary fuel supply facility that supplies kerosene as fuel;
- a branch pipe that is branched off from the water supply pipe and connected to the main fuel supply system, wherein the branch pipe supplies ammonia water to the main fuel supply system; and
- an interruption valve provided in the branch pipe.

* * * * *